(12) United States Patent
Chandra et al.

(10) Patent No.: US 8,401,849 B2
(45) Date of Patent: Mar. 19, 2013

(54) METHODS EMPLOYING PHASE STATE ANALYSIS FOR USE IN SPEECH SYNTHESIS AND RECOGNITION

(75) Inventors: Nishant Chandra, Shrewsbury, MA (US); Reiner Wilhelms-Tricarico, Belchertown, MA (US); Rattima Nitisaroj, West Newton, MA (US); Brian Mottershead, West Newton, MA (US); Gary A. Marple, West Newton, MA (US); John B. Reichenbach, West Newton, MA (US)

(73) Assignee: Lessac Technologies, Inc., West Newton, MA (US)

( * ) Notice: Subject to any disclaimer, the term of this patent is extended or adjusted under 35 U.S.C. 154(b) by 626 days.

(21) Appl. No.: 12/639,164

(22) Filed: Dec. 16, 2009

(65) Prior Publication Data

US 2010/0161327 A1 Jun. 24, 2010

Related U.S. Application Data

(60) Provisional application No. 61/138,834, filed on Dec. 18, 2008.

(51) Int. Cl.
*G10L 15/26* (2006.01)
(52) U.S. Cl. ........................................ 704/235
(58) Field of Classification Search ............ 704/235
See application file for complete search history.

(56) References Cited

U.S. PATENT DOCUMENTS

| | | | |
|---|---|---|---|
| 5,729,694 A * | 3/1998 | Holzrichter et al. | 705/17 |
| 6,615,174 B1 * | 9/2003 | Arslan et al. | 704/270 |
| 6,847,931 B2 | 1/2005 | Addison et al. | |
| 6,865,533 B2 | 3/2005 | Addison et al. | |
| 6,963,841 B2 | 11/2005 | Handal et al. | |
| 7,280,964 B2 | 10/2007 | Wilson et al. | |
| 8,195,463 B2 * | 6/2012 | Capman et al. | 704/258 |
| 2005/0060155 A1 * | 3/2005 | Chu et al. | 704/269 |
| 2005/0137858 A1 * | 6/2005 | Heikkinen et al. | 704/205 |
| 2005/0182629 A1 * | 8/2005 | Coorman et al. | 704/266 |
| 2007/0260461 A1 | 11/2007 | Marple et al. | |
| 2008/0195391 A1 | 8/2008 | Marple et al. | |
| 2009/0048843 A1 | 2/2009 | Nitisaroj et al. | |

OTHER PUBLICATIONS

Rao et al., "Prosody Modification Using Instants of Significant Excitation", IEEE Transactions on Audio, Speech, and Language Processing, vol. 14, No. 3, May 2006, pp. 972-980.

* cited by examiner

*Primary Examiner* — Michael N Opsasnick
(74) *Attorney, Agent, or Firm* — K&L Gates LLP

(57) ABSTRACT

A computer-implemented method for automatically analyzing, predicting, and/or modifying acoustic units of prosodic human speech utterances for use in speech synthesis or speech recognition. Possible steps include: initiating analysis of acoustic wave data representing the human speech utterances, via the phase state of the acoustic wave data; using one or more phase state defined acoustic wave metrics as common elements for analyzing, and optionally modifying, pitch, amplitude, duration, and other measurable acoustic parameters of the acoustic wave data, at predetermined time intervals; analyzing acoustic wave data representing a selected acoustic unit to determine the phase state of the acoustic unit; and analyzing the acoustic wave data representing the selected acoustic unit to determine at least one acoustic parameter of the acoustic unit with reference to the determined phase state of the selected acoustic unit. Also included are systems for implementing the described and related methods.

19 Claims, 10 Drawing Sheets

METHODS EMPLOYING PHASE STATE ANALYSIS FOR USE IN SPEECH SYNTHESIS AND RECOGNITION

CROSS REFERENCE TO A RELATED APPLICATION

This application claims the benefit of provisional patent application No. 61/138,834, filed on Dec. 18, 2008, the disclosure of which provisional patent application is incorporated by reference herein.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT (Not Applicable.)

The present invention provides system-effected methods for analyzing, predicting, and/or modifying acoustic units of human utterances for use in speech synthesis and recognition. The invention also provides computerized systems and software for implementing the inventive methods. In addition, the present invention provides, inter alia, methods of computer implemented, automated, analysis of expressive human utterances that are linguistically as well as cognitively meaningful. The results of the analysis can be employed in computerized text-to-speech synthesis or in computerized speech recognition or in both synthesis and recognition. The inventive method disclosed herein relates generally to a method of quantifying and automating the analysis of expressive human utterances that are linguistically as well as cognitively meaningful, for use in text-to-speech synthesis or speech recognition or both.

BACKGROUND OF THE INVENTION

The human voice communicates meaning and identity simultaneously. Typically, an expressive human voice emphasizes syllables, phrases, even paragraphs, to clarify what is being said, and has unique voice characteristics that tell one who is speaking. One objective of speech synthesis can be to create synthesized speech that communicates the voice identity of the speaker and that speaks with rhythms, intonations, and articulations that are close to those of a human being.

Two known approaches for synthesizing speech, formant based and, concatenation of acoustic units from voice recordings, have shortcomings in this respect. While the concatenated approach using prerecorded speech units can provide a generally identifiable voice, it is usually unable to simultaneously provide expressive voice emphases and intonations that enhance the listener's understanding of the text being synthesized as speech.

U.S. Patent Application Publication No. 2008/0195391 to Marple et al. describes a hybrid speech synthesizer, method and use, which includes embodiments comprising a hybrid of the known formant and concatenation methods for synthesizing speech. As described, speech synthesizer embodiments can predict, locate, and concatenate wave forms in sequence to provide acoustic units for expressive utterances when a specified acoustic unit (or a close facsimile thereof) is found to exist in a database of acoustic units. When the predicted acoustic unit is not found, the synthesizer can manipulate acoustic wave data for an acoustic unit candidate that is close to the predicted values of the ideal candidate so as to create an ideal candidate, or a perceptually acceptable substitute.

U.S. patent application Ser. No. 12/188,763 to Nitisaroj et al. describes a method of automated text parsing and annotation for expressive prosodies that indicates how the text is to be pronounced which is useful in speech synthesis and voice recognition. Also described are the abilities of professional voice talents trained to produce expressive speech according to annotations for a particular prosody in terms of articulations, with desired pitches, amplitudes, and rates of speech.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

The present invention provides, in one aspect, a computer-implemented method for analyzing, predicting, and/or modifying acoustic units of prosodic human speech utterances for use in speech synthesis or speech recognition. Broadly stated, this aspect of the inventive method can comprise one or more steps selected from the following:

initiating analysis of acoustic wave data representing the human speech utterances, via the phase state of the acoustic wave data, the acoustic wave data being in constrained or unconstrained form;

using one or more phase state defined acoustic wave metrics as common elements for analyzing, and optionally modifying, one or more measurable acoustic parameters selected from the group consisting of pitch, amplitude, duration, and other measurable acoustic parameters of the acoustic wave data, at predetermined time intervals, two or more of the acoustic parameters optionally being analyzed and/or modified simultaneously;

analyzing acoustic wave data representing a selected one of the acoustic units to determine the phase state of the acoustic unit; and analyzing the acoustic wave data representing the selected acoustic unit to determine at least one acoustic parameter of the acoustic unit with reference to the determined phase state of the selected acoustic unit.

A further aspect of the invention provides a computer-implemented method comprising matching a sequence of acoustic units comprising a speech signal containing continuous prosodic human speech utterances with a sequence of text capable of visually representing the speech in the speech signal. The matching can comprise one or more of the method steps described herein.

In another aspect, the invention provides a method for categorically mapping the relationship of at least one text unit in a sequence of text to at least one corresponding prosodic phonetic unit, to at least one linguistic feature category in the sequence of text, and to at least one speech utterance represented in a synthesized speech signal. The method can comprise one or more steps selected from the following:

identifying, and optionally modifying, acoustic data representing the at least one speech utterance, to provide the synthesized speech signal;

identifying, and optionally modifying, the acoustic data representing the at least one utterance to provide the at least one speech utterance with an expressive prosody determined according to prosodic rules; and identifying acoustic unit feature vectors for each of the at least one prosodic phonetic units, each acoustic unit feature vector comprising a bundle of feature values selected according to proximity to a statistical mean of the values of acoustic unit candidates available for matching with the respective prosodic phonetic unit and, optionally, for acoustic continuity with at least one adjacent acoustic feature vector.

A further aspect of the invention provides a method of mapping a text unit to a prosodic phonetic unit, which method comprises determining individual linguistic and acoustic weights for each prosodic phonetic unit according to linguistic feature hierarchies. The linguistic feature hierarchies can be related to a prior adjacent prosodic phonetic unit in a sequence of prosodic phonetic units and to a next adjacent prosodic phonetic unit in the sequence, and each candidate acoustic unit can have different target and join weights for each respective end of the candidate acoustic unit, although, in a suitable context the target and join weights for the ends of a prosodic phonetic unit can be similar, if desired. The methods of the invention can include measuring one or more acoustic parameters, optionally F0, F1, F2, F3, energy, and the like, across a particular acoustic unit corresponding to a particular prosodic phonetic unit to determine time related changes in the one or more acoustic parameters, and can include modeling the particular acoustic unit and the relevant acoustic parameter values of the prior adjacent prosodic phonetic unit and the next adjacent prosodic phonetic unit.

Modeling can comprise: applying combinations of fourth-order polynomials and second- and third-order polynomials to represent n-dimensional trajectories of the modeled acoustic units through unconstrained acoustic space; or applying a lower-order polynomial to trajectories in constrained acoustic space; and optionally can comprise modeling diphones and triphones.

If desired, pursuant to further aspects of the invention, linguistically selected acoustical candidates can be employed for calculating acoustic features for synthesizing speech utterances from text. For example, linguistically selected acoustical candidates can be employed by calculating an absolute and/or relative desired acoustic parameter value, optionally in terms of fundamental frequency and/or a change in fundamental frequency over the duration of the acoustic unit. The duration can be represented by a single point, multiple points, Hermite splines or any other suitable representation. The desired acoustic parameter value can be based on a weighted average of the actual acoustic parameters for a set of candidate acoustic units selected according to their correspondence to a particular linguistic context. If desired, the weighting can favor acoustic unit candidates more closely corresponding to the particular linguistic context.

A further aspect of the invention provides a method for assigning linguistic and acoustic weights to prosodic phonetic units useful for concatenation into synthetic speech or for speech recognition. This method can comprise determining individual linguistic and acoustic weights for each prosodic phonetic unit according to linguistic feature hierarchies related to a prior adjacent prosodic phonetic unit and to a next adjacent prosodic phonetic unit. Each candidate acoustic unit can have different target and join weights for each respective end of the candidate acoustic unit, if desired, or in some circumstances the target and join weights can be the same.

The weight-assigning method can also include measuring one or more acoustic parameters, optionally F0, F1, F2, F3, energy, and the like, across a particular acoustic unit corresponding to a particular prosodic phonetic unit to determine time related changes in the one or more acoustic parameters and/or modeling the particular acoustic unit and the relevant acoustic parameter values of the prior adjacent prosodic phonetic unit and the next adjacent prosodic phonetic unit.

A still further aspect of the invention provides a method for deriving a path through acoustic space. The acoustic path can comprise desired acoustic feature values for each sequential unit of a sequence of acoustic units to be employed in synthesizing speech from text. The method can comprise calculating the acoustic path in absolute and/or relative coordinates, for example, in terms of fundamental frequency and/or a change in fundamental frequency over the duration of the synthesizing of the text, for the sequence of acoustic units. Each desired sequential acoustic unit can be represented by a representation, such for example as a single point, multiple points, Hermite splines or another suitable acoustic unit representation, according to a weighted average of the acoustic parameters of the acoustic unit representation. The weighted average of the acoustic parameters can be based on a degree of accuracy with which the acoustic parameters for each such sequentially desired acoustic unit are known, and/or on a degree of influence ascribed to each sequential acoustic unit according to the context of the acoustic unit in the sequence of desired acoustic units.

Yet another aspect of the invention provides a method of deriving an acoustic path comprising a sequence of desired acoustic units extending through unconstrained acoustic space, the acoustic path being useful for synthesizing speech from text with a desired style of speech prosody by concatenating the sequence of desired acoustic units. The method can comprise one or more of the following steps or elements:

providing a database of acoustic units wherein each acoustic unit is identified according to a prosodic phonetic unit name and at least one additional linguistic feature; and wherein each acoustic unit has been analyzed according to phase-state metrics so that pitch, energy, and spectral wave data can be modified simultaneously at one or more instants in time;

mapping each acoustic unit to prosodic phonetic unit categorizations and additional linguistic categorizations enabling the acoustic unit to be specified and/or altered to provide one or more acoustic units for incorporation into expressively synthesized speech according to prosodic rules;

calculating weighted absolute and/or relative acoustic values for a set of candidate acoustic units to match each desired acoustic unit, one candidate set per desired acoustic unit, matching being in terms of linguistic features for the corresponding mapped prosodic phonetic unit or a substitute for the corresponding mapped prosodic phonetic unit;

calculating an acoustic path through n-dimensional acoustic space to be sequenced as an utterance of synthesized speech, the acoustic path being defined by the weighted average values for each candidate set of acoustic units; and selecting and modifying, as needed, a sequence of acoustic units, or sub-units, for the synthesized speech according to the differences between the weighted acoustic values for a candidate acoustic unit, or sub-unit, and the weighted acoustic values of a point on the calculated acoustic path.

Some aspects of the present invention enable the description of acoustic dynamics that can be employed in expressive utterances of human speakers speaking texts according to prosodic rules derivable from the text to be pronounced, from the relationship(s) of speaker(s) to listener(s) and from their motives for speaking and listening.

BRIEF DESCRIPTION OF THE SEVERAL VIEWS OF THE DRAWINGS

Some embodiments of the invention, and of making and using the invention, as well as the best mode contemplated of carrying out the invention, are described in detail herein and, by way of example, with reference to the accompanying drawings, in which like reference characters designate like elements throughout the several views, and in which.

DETAILED DESCRIPTION OF THE INVENTION

Figure 1:
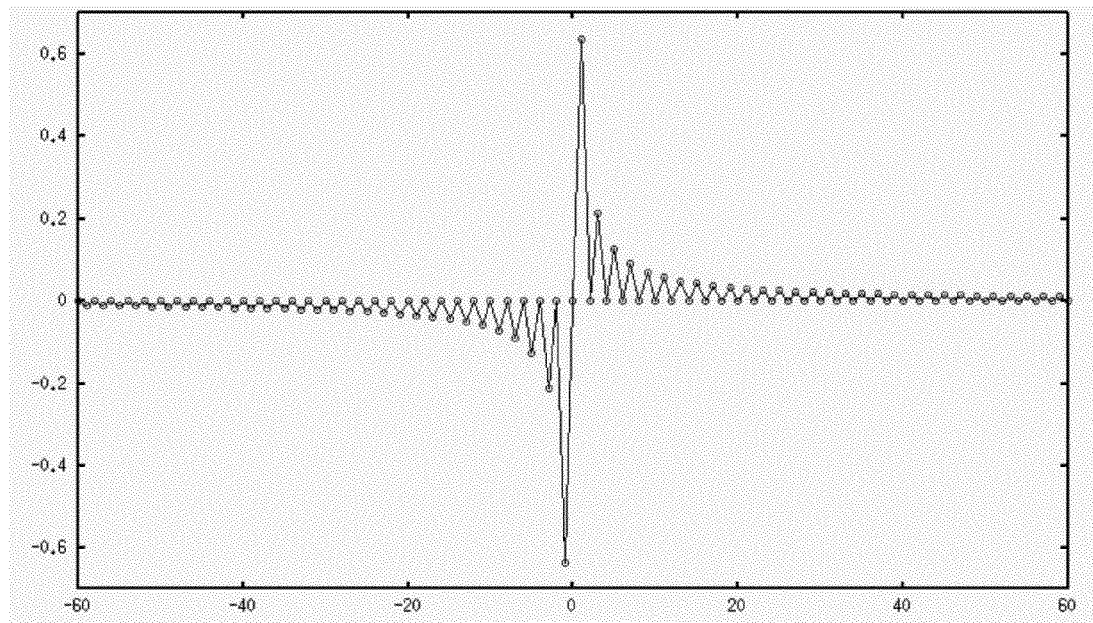
FIG. 1 is a graphical depiction of an impulse response obtainable by filtering an acoustical speech-related signal with an impulse response convolution filter, useful in an analytical method embodiment of the invention.

Methods according to the invention can include concatenating a selected acoustic unit with an additional acoustic unit having at least one acoustic parameter compatible with the respective selected acoustic unit parameter as determined in a phase state of the additional acoustic unit similar to, or identical with, the phase state of the selected acoustic unit. If desired, the additional acoustic unit can have a pitch, amplitude and duration compatible with the pitch, amplitude and duration of the selected acoustic unit.

If desired, method embodiments of the invention can include matching a sequence of the acoustic units with a sequence of text capable of visually representing the speech utterances. Optionally, the speech utterances can have an identifiable prosody and the method can comprise labeling the text with prosodic phonetic units to represent the sequence of text with the prosody identified in the speech signal.

Furthermore, method embodiments of the invention can include tagging each prosodic phonetic unit with a bundle of acoustic feature values to describe the prosodic phonetic unit acoustically. The acoustic feature values can comprise values for context-independent prosodic phonetic unit features and, optionally, context-dependent prosodic phonetic unit features determined by applying linguistic rules to the sequence of text Other useful steps that can be employed in the practice of the invention, either alone or with one or more others of the steps listed or of the method steps and elements described elsewhere herein, include the following:

assembling the sequence of acoustic units from available acoustic units in a database of acoustic units wherein, optionally, each available acoustic unit in the database can comprise a recorded element of speech voiced by a human speaker;

determining a desired acoustic unit pathway comprising a sequence of acoustic feature vectors corresponding with a sequence of the acoustic units or with a sequence of text representing the speech utterances;

employing for each acoustic feature vector a bundle of feature values selected for closeness to a statistical mean of the values of candidate acoustic units to be matched with a prosodic phonetic unit or one of the prosodic phonetic units and, optionally, for acoustic continuity with at least one adjacent acoustic feature vector;

selecting an acoustic unit for the sequence of acoustic units from the database of candidate acoustic units according to the proximity of the feature values of the selected acoustic unit to a corresponding acoustic feature vector on the acoustic unit pathway and, optionally, for acoustic continuity of the selected acoustic unit with the acoustic feature values of one or more neighboring acoustic units in the sequence of acoustic units;

selecting each acoustic unit for the sequence of acoustic units according to a rank ordering of acoustic units available to represent a specific prosodic phonetic unit in the sequence of text, the rank ordering being determined by the differences between the feature values of available acoustic units and the feature values of an acoustic feature vector on the acoustic unit pathway; and determining individual linguistic and acoustic weights for each prosodic phonetic unit according to linguistic feature hierarchies related to a prior adjacent prosodic phonetic unit and to a next adjacent prosodic phonetic unit, wherein each candidate acoustic unit can have different target and join weights for each respective end of the candidate acoustic unit.

The methods of the invention can, if desired, employ one or more further steps or elements selected from the following:

modifying a candidate acoustic unit by analyzing the candidate acoustic unit wave data into a vocal tract resonance signal and a residual glottal signal, modifying an acoustic parameter of the glottal signal and recombining the vocal tract resonance signal with the modified glottal signal to provide a modified candidate acoustic unit;

analyzing the glottal signal to determine the time-dependent amplitude of the glottal signal with reference to the phase state of the glottal signal, determining the fundamental frequency of the glottal signal in the phase state and modifying the fundamental frequency of the glottal signal in the phase state to have a desired value; and when the vocal tract resonance signal comprises partial correlation coefficients, modifying the vocal tract resonance signal by converting the partial correlation coefficients to log area ratios and altering or interpolating the log area ratios.

In the methods provided by the invention and its various aspects, the acoustic metrics or acoustic parameters can comprise one or more metrics or parameters selected from the group consisting of pitch, amplitude, duration, fundamental frequency, formants, mel-frequency cepstral coefficients, energy, and time:

Various optional features employable in the methods of the invention include that:

the speech signal can be a synthesized speech signal comprising a sequence of acoustic units concatenated to audibilize the sequence of text;

that the acoustic units can be derived from prosodic speech recordings generated by human speakers pronouncing text annotated according to specific rules for a defined prosody;

that the sequence of text can be generated to visually represent the speech recognized in the speech signal; and that the sequence of text can be selected from the group consisting of a phrase, a sentence, multiple sentences, a paragraph, multiple paragraphs, a discourse, and a written work.

The invention also includes a computerized system comprising software for performing any of the invention methods described herein. The software can be stored in, or resident in, computer readable media and optionally can be running on the computerized system.

In one aspect the inventive method can utilize acoustic wave metrics for measuring physical properties of acoustic waves, for example, fundamental frequency (F0), mel-frequency cepstral coefficients ("MFCCs"), energy, and time uttered by human speakers.

Initially, speakers can be trained professionals able to speak expressively for specific prosodies as defined by the text to be pronounced. The text to be pronounced can be parsed using prosodic text parsing rules (disambiguation, part of speech tagging, syntactical structure, prosodic phrasing, lexical stress, simple semantics, discourse rules, etc.) and then annotated to be spoken according to one or more specific prosodies derived automatically from the text to be synthesized, plus the speaker(s) relationship to the listener(s) and their predicted motives for speaking and listening.

Analytic methods according to the invention can use traditional acoustic wave metrics in ways that can be simultaneously precise and applicable for the purposes of: (1) automatically synthesizing prosodic speech directly from plain text input, or (2) for correctly recognizing text directly from expressively articulated speech utterances, or for both synthesis and recognition.

In another aspect of the invention, predictions of values for physical wave metrics can be used to synthesize expressive prosodic speech directly from text. To recognize expressive human speech utterances and transcribe it correctly as text, various measured values of physical waves can be analyzed for patterns corresponding to alternative utterances of words, phrases and sentences according to identifiable prosodies and their linguistic dependencies.

Methods according to the invention can be trained, using machine learning principles, to be applied to the voices of everyday persons, including their dialects and mispronunciations, along with any unusual vocal properties they may have due to various physical anomalies for example gravelly, raspy, hoarse, high-pitched and the like. Also, some methods according to the invention can be used to generate special vocal effects and prosodies to be used by computer game avatars, science fiction entities, and stereotypical characters.

Individuals commonly vary their pronunciations for the same word within their own speech. Acoustic modeling based on recorded data can be unrewarding because of large variability in the acoustical properties of the speech utterances leading speech synthesis and speech recognition practitioners to "normalize" their acoustic data. Thus, speech synthesis practitioners may limit the speech synthesis range to substantially less than the normally expressive ranges of most human speakers who may exhibit wide fluctuations of pitch, amplitude and duration for the same words in their utterances. And speech recognition practitioners may pre-process speech, equalizing durations, reducing pitch change ranges, and limiting loudness excursions for lexical and phrasal stresses for phonemes and words. Such compromises can lead to poor results.

Aspects of the invention described herein can utilize acoustic utterance units, termed "prosodic phonetic units" herein which can communicate prosodic elements in a speech utterance and can be distinguished from phonemes which do not usually communicate prosody or prosodic elements. As is described herein, prosodic phonetic units can be employed for the production of computer-articulated utterances wherein pitch, amplitude, duration and other acoustic parameters can be varied so as to yield speech utterances according to a particular prosody.

Considered another way, the term "prosodic phonetic unit" can be understood as designating a common symbol that can be interposed, in the case of text-to-speech, between text to be spoken and an acoustic unit uttered; and, in the case of speech to be recognized as text, between the unit uttered and the text representing the utterance. The physical speech can be digitized and measured in terms of pitch, harmonics, formants, amplitude, duration, and so on. Further abstractions can be derived or calculated to represent the physical speech data in different ways, for example linear prediction coefficients, Hermite splines, and so on, and can be used to estimate or represent the amount of modification or adjustment that may be necessary for the output to be accurately perceived as continuous speech, whether it be actual speech perceived by a machine or synthesized speech perceived by a human listener.

For example, there may be considered to be 54 phonemes in General American English. In contrast, methods according to the present invention can employ far greater numbers of prosodic phonenetic units for a given style of prosodic speech. For example, in excess of 1,300 uniquely identifiable prosodic phonetic units can be used for synthesizing or recognizing a reportorial prosody in General American English.

A basic prosodic style in General American English is identified as "Reportorial" and is known as a style of expressive intonations, pronunciations, and speaking rhythms, such as exemplified by a National Public Radio News announcer. Reportorial General American English is referred to herein as "the base prosody". If desired, suitable numbers of various spoken corpuses and prosodies available in a field, or a language, can be examined to arrive at a suitable number of prosodic phoneticprosodic phonetic units to provide in a database for practicing one or more of the methods of the invention in the respective field or language. Prosodic phoneticProsodic phonetic units, as described herein, can be employed in the inventive methods disclosed herein. Alternatively, or in addition, each of these methods can be practiced with the use of standard phonemes, if desired.

Any suitable number of prosodic phonetic units can be employed in the practice of one or more of the methods of the invention, as will be understood by a person of ordinary skill in the art in light of this disclosure. For example, a useful database employed in the practice of the invention can be populated using about 600 uniquely identifiable prosodic phonetic units with the average prosodic phonetic unit having about 225 examples of its giving a total number of units in the database of approximately 135,000. These numbers are of course merely illustrative and can be varied widely depending upon the application and the available examples. Thus, some uniquely identifiable prosodic phonetic units may contain or be associated with 1,000 or more examples of their use, and others may contain or be associated with less than 50, for example as few as five, ten or twenty. The number of prosodic phonetic units can be in a range of from about 100 to about 6,000 or 7,000 or more. A number of prosodic phonetic units in a range of from about 300 to about 2,000 can be useful for some purposes. The total number of units in the database can also vary and can, for example be in a range of from about 2,000, more desirably 20,000 to about 200,000 or 300,000 or even higher. Thus, a comprehensive application addressing a number of different prosodic styles could have as many as 1 or 2 million or more acoustic units, perhaps up to about 15 million. Such a database could employ about 15,000 prosodic phonetic units each having about 1,000 exemplary acoustic units, on average; which is merely an example of a larger database. The particular numbers can of course be varied, as will be, or become, apparent to a person of ordinary skill in the art.

Other suitable combinations of prosodic phonetic units and exemplary acoustic units may be used to arrive at an appropriately sized database size. Some useful determinants of suitability can include such items as the expressive range in voiced pitch levels, articulatory rhythms applied to words and phrases, the particular number and styles of prosodic speech, grammar and vocabulary, and the amount of modification applied to a prosodic acoustic unit.

Even when using an extensive database of prosodic phoneticprosodic phonetic units there may still be variations in the acoustic parameters of speech. Pursuant to the invention, acoustical parameter variations can be managed by grouping acoustic units and comparing them according to their location in a linguistic hierarchy. Furthermore, some aspects of the invention include methods of accounting for acoustic context in sequence, such as: pitch level and location within an intonation profile; durations of voiced and unvoiced acoustic units, as well as of silences; and, to variations for loudness, stress, and/or prominence. Methods according to the invention can enable prediction of specific optimal acoustical parameters desired for a specific relevant context; this prediction can enable selection of a useful or optimal acoustic unit from those units available to be used in expressive speech synthesis. The acoustic unit prediction and selection can employ prosodic phoneticprosodic phonetic units annotated according to prosodic text parsing and having linguistic labels. The method of the invention can also allow the selected unit to be modified to more closely match specific predicted optimal acoustic parameters. Embodiments of methods according to the invention can provide prosodic speech synthesis that reduces the listener's cognitive workload and enhances her or his perception and comprehension of the text being synthesized.

The recognition of prosodic phoneticprosodic phonetic units according to patterns of acoustic parameters relating to commonly used speech prosodies can improve speech recognition by correctly identifying more of the text, as uttered, directly from the acoustic data, and can also provide automated annotations to the text that indicate the emotional state of the speaker.

To create databases useful in the practice of the invention, trained speakers can be initially employed as voice models to provide a limited number of examples of each of various voices types, for example male, female, young, old, fundamental voice frequencies for speakers with low-, middle- and high-pitched voices, etc. and so on, speaking each of various prosodies. Samplings of text in a wide range of text genres can be employed and predictions can be made of the maximum number of prosodic phoneticprosodic phonetic units in actual use along with their indicated frequencies of use and according to the various genres. For example, a database for a single voice speaking a text corpus representative of General American English according to rules for a basic prosody can comprise from 3 to 10 hours of recorded speech. Each additional prosody spoken may require fewer hours of recorded speech as subsequent prosodies will likely include numerous pronunciations in common with prior prosodies which do not require duplicating.

By employing sufficient numbers of speaking voices, and by using machine learning techniques, if desired, the method can be generalized to: use a few hours of voice recordings of ordinary persons and then synthesize prosodic speech from input text with a synthesized voice having the sound of the ordinary person's voice; and, with special effects for modifying voices, to craft distinctive voices for new fictional characters.

The analysis of linguistically dependent acoustic units from prosodically pronounced and recorded speech can be used to predict acoustic wave metrics for concatenation. In the event that a candidate acoustic unit does not completely fit an ideal, acoustic parametric manipulations for one or more close candidates can be specified and evaluated to create a useable candidate that can be either identical to, or perceptually close enough to, the ideal candidate to be used in expressive synthesis by an identifiable voice and in accordance with a specific speaking prosody.

Methods for Analysis of Prosodic Speech

Concatenated speech synthesis often uses segments of recorded speech that are broken into small utterances. Misalignment of the basic pitch level, F0, as well as the misalignment of the formants F1, F2, etc. between two short segments to be concatenated often yields perceivable "glitches" in the sound of the synthesized speech.

Known methods of providing text-to-speech synthesis software and acoustic unit databases often seek to reduce variations in pitch by calling for a voice talent who reads the text to provide the recorded speech, to speak with reduced intonation patterns (i.e. reduce the number and range of pitch changes). Also, post-processing techniques may be employed to smooth the places where adjacent acoustic units are joined. Joins are sometimes accomplished by working with the wave data in pitch synchronous form and performing some form of "overlap and add" process to smooth the join points. The result may be perceived as slightly "muddied" speech, but nevertheless smoothed and not yielding complaints about being distracting or incomprehensible. Similarly, durations of sounds and loudness are also addressed by post-processing procedures being applied to the wave form units as concatenated.

Such methods may be unable to yield prosodic speech with meaningful changes in pitches, amplitudes, and durations. The inventive method re-examined the requirements for changing pitch, amplitude, and duration, all instantaneously, by undertaking a general method for entering the process of wave data manipulation via the phase state as the common element for undertaking simultaneous changes prior to concatenation. One such method is further described below.

Analyzing Prosodic Speech Utterances

A real valued signal x(t) (as function of time t) can be extended to an analytical signal in the complex domain by computing the Hilbert transform shown below as equation 1:

$$y(t) = H(x(t)) = \frac{1}{\pi} \int_{-\infty}^{\infty} \frac{x(\tau)}{t - \tau} d\tau \qquad \text{(Eq. 1)}$$

See, for example, Online Encyclopedia of Mathematics, at eom.springer.de.

In practical digital signal processing applications an approximation of the Hilbert transform of a signal can be obtained by a finite impulse response convolution filter using an impulse response as shown in FIG. 1. The impulse response shown in FIG. 1 is a digital approximation of the output of a Hilbert transform filter using a length of 121 samples.

Using a complex valued combination of the original signal as the real part and its Hilbert transform as the imaginary part, the analytical signal z(t)=x(t)+i y(t) is formed. This signal z(t), can be illustrated as a path in the complex plane, as is exemplified graphically in FIG. 4. If the analytical signal is understood as a moving point in the plane described by its distance from the origin and the angle relative to the real axis, one obtains a polar form of the signal with the formal representation:

$$z(t) = |z(t)| e^{i\Theta(t)} \qquad \text{(Eq. 2)}$$

In this representation, the complex value z(t) is understood as a momentary point in the complex domain at time t. Then, the amplitude |z(t)| corresponds to the distance from the origin and the phase Θ(t) to the angle relative to the real axis. The amplitude and phase can be obtained by the following computations (Eq. 3)

$$A(t) = |z(t)| = \sqrt{x^2(t) + y^2(t)} \text{ and} \qquad \text{(Eq. 3)}$$

$$\Theta(t) = \arctan \frac{y(t)}{x(t)}$$

Figure 2A:
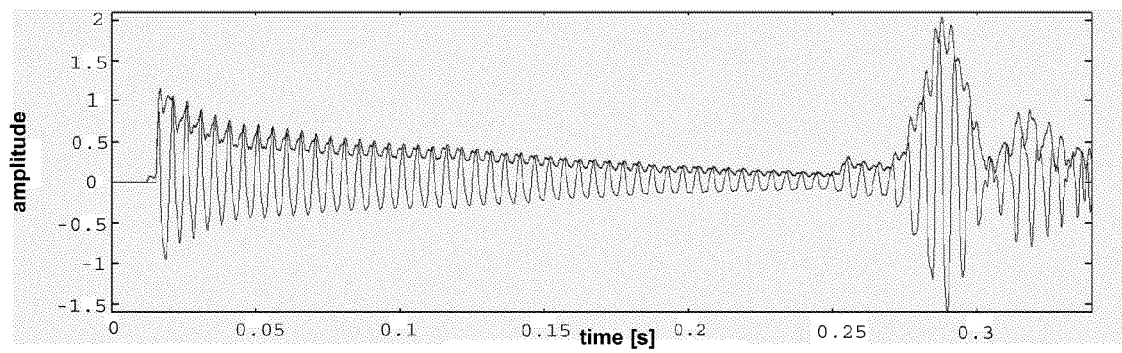
FIG. 2A is a graphical depiction of an envelope for a low pass filtered residual signal obtained by inverse filtering of a signal from a single word, the word "way", the inverse filtering being useful in another analytical method embodiment of the invention.

Thus, the instantaneous phase Θ(t) can be obtained by the inverse of the trigonometric tangent function which transforms the ratio of the imaginary and real part of z(t) into an angle. An example of the instantaneous amplitude of the signal |z(t)| is shown in FIG. 2A as the envelope of the signal, and an example of the phase function Θ(t) is shown FIG. 2B. In FIG. 2A, amplitude on an ordinate scale of from 2 to −1.5 is plotted against time on an abscissa scale of from 0 to 0.35 seconds. Referring to FIG. 2A, the signal and envelope |z(t)| for a low pass filtered residual signal shown can be obtained by inverse filtering, integrating over time, and applying the Hilbert transform. The signal is from the word "way" with dropping pitch, followed by an aspirated sound for which the autoregressive model may no longer hold true and a larger error signal may appears.

Figure 2B:
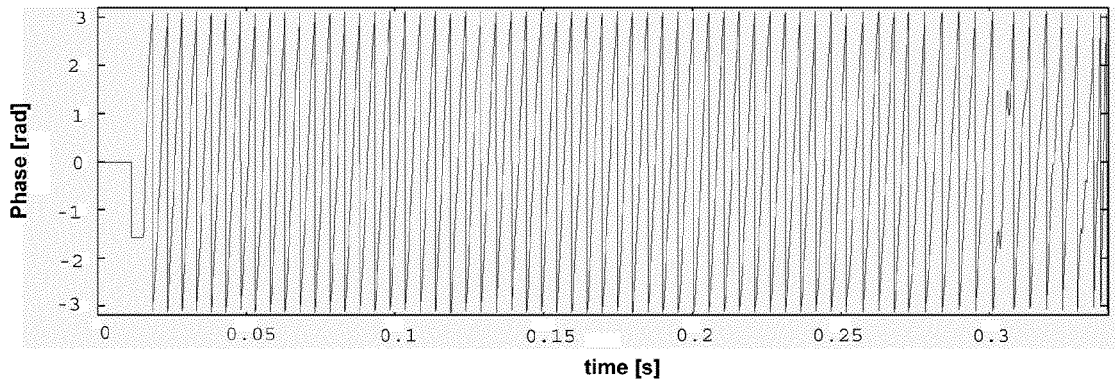
FIG. 2B is a graphical depiction of the corresponding instantaneous phase of the signal employed in FIG. 2A.

In FIG. 2B the corresponding instantaneous phase Θ(t) can be seen. In FIG. 2B, phase in radians is plotted on an ordinate scale from π to −π is plotted against time on an abscissa scale of from 0 to 0.35 seconds.

Phase Unwrapping

The phase Θ(t) can be obtained numerically only within a constant offset of a multiple of 2π, because the inverse tangent function delivers only values in the interval [−π, π], resulting in a zigzag curve as shown in FIG. 2B. An unwrapped phase can be implicitly defined as a function, which, taken modulo 2π, gives the observed phase function:

$$\Theta(t) = \Theta_u(t) \bmod 2\pi \qquad \text{(Eq. 4)}$$

Unwrapping thus consists of inverting this relationship, which cannot be done analytically, starting from a digital signal representation of θ(t). If the phase changes rapidly, phase unwrapping becomes problematic, because for larger jumps it becomes ambiguous whether π or −π should be added. However, by exploiting the properties of the analytical signal, a more reliable method can be found. In the digital domain, for two consecutive values of the signal (at sample times n and n+1) for the sample values x[n] and x[n+1], the corresponding samples of the analytical function are z[n]=x[n]+i y[n] and z[n+1]=x[n+1]+i y[n+1]. If the phase θ[n] is known, the phase difference can be obtained by a complex division, which in polar coordinates can be formally written as:

$$z[n+1]/z[n] = \frac{|z[n+1]|}{|z[n]|} e^{i(\Theta[n+1] - \Theta[n])} \qquad \text{(Eq. 5)}$$

The phase difference occurs in the exponent as θ[n+1]−θ[n], and it represents the increment in phase between time n and n+1. As long as the underlying signal consists only of frequencies sufficiently below the Nyquist frequency (½ of the sampling frequency), which can be the case for the signals here considered, the relative phase increments should be less than ±π/2. The phase values can then be obtained simply by adding up the phase increments. Formally, a recursive scheme of computation for the phase at time n+1 as shown in (Eq. 6) can be obtained, which follows from the algebraic representation of the complex division.

$$\Theta[n+1] = \Theta[n] + \arctan\left(\frac{x[n]y[n+1] - x[n+1]y[n]}{x[n+1]x[n] + y[n+1]y[n]}\right) \qquad \text{(Eq. 6)}$$

A meaningful starting value of the phase is to use θ[0]=0 for a time point that corresponds to a peak in the amplitude of the analytic signal. From there on, the phase of all subsequent samples x[n] can be computed recursively based on the analytic signal. This method can be reliable if the signal is sufficiently smooth, which can usually be achieved by using a sufficiently band limited signal.

Figure 3:
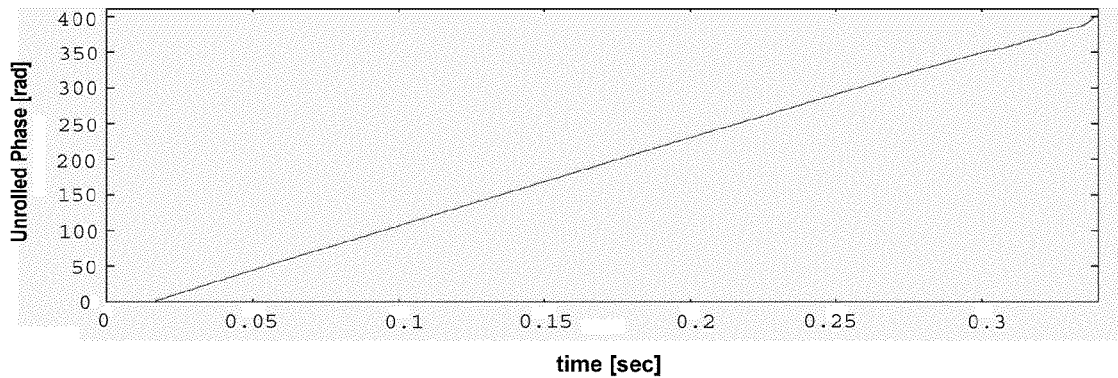
FIG. 3 is a graphical depiction of the unwrapped or unrolled phase of the signal employed in FIG. 2A.

An example of a useful method, employs a low pass filtered version of the residual signal obtained from the Burg lattice filter to provide small phase increments. The input to the Burg lattice filter is a speech signal which is filtered by a pre-emphasis filter, which emphasizes higher frequencies to increase the accuracy of the partial correlation coefficients representation, described elsewhere herein. The residual signal is further processed by a leaky integrator to reverse the pre-emphasis. For the purpose of estimating an unrolled phase signal a low pass filtered version of this signal can be used. In the example illustrated, the signal can be obtained by applying a Butterworth low, pass filter with a cutoff frequency of 1200 Hz. FIG. 3 shows the unrolled phase of the signal and the slope of this curve is $2\pi$ times the instantaneous fundamental frequency, which is to say, $2\pi$ F0

The unrolled phase can be used directly to obtain pitch pulse sequences. For the beginning of a voiced signal portion a point in time can be searched where the residual signal goes through a local energy maximum. The value of the unrolled phase at that point can be subtracted from the remaining unrolled phase signal, and pitch marks can be obtained as the time stamps where this signal traverses a multiple of $2\pi$. Based on this analysis, the analytic signal analysis of the glottal waveform can be used for identifying glottalization and period doubling or halving in rapid transitions (for example for rapidly lowering the fundamental frequency). Period doubling or halving may be associated with the appearance of a second order irregularity in the signal, so that the glottal signal has an alternating short and a long pitch pulse interval as illustrated in FIGS. 4 and 5.

Figure 4:
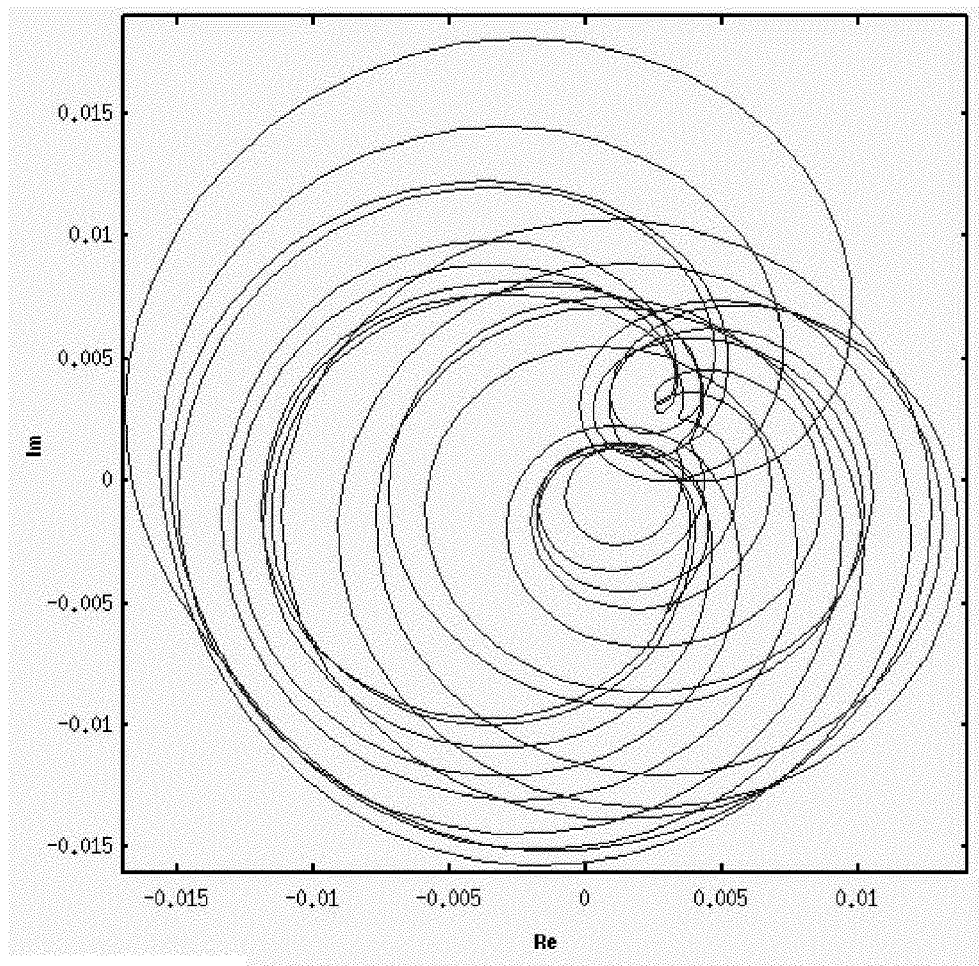
FIG. 4 is a graphical depiction of an analytic signal in the complex domain representing a portion of the word "way" depicted in FIG. 2A.

In FIG. 4, the analytic signal of the vowel transition for the letter "a" demonstrates period doubling. The two centers of convolution visible center right of the figure suggest two fundamental frequencies and that phase is shifting with respect to time.

Figure 5:
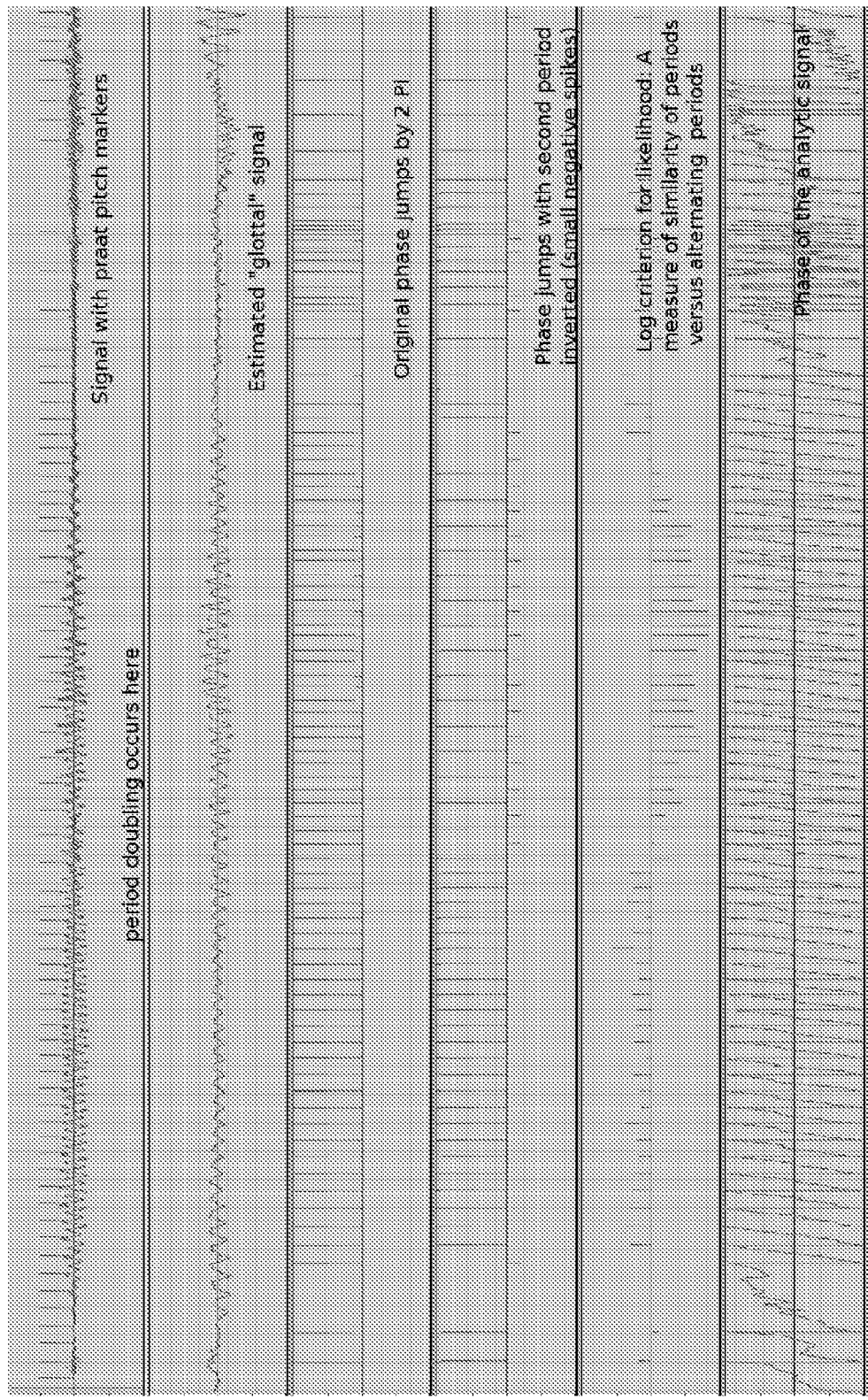
FIG. 5 is a graphical depiction of several processing stages, reading from the top to the bottom of the figure, of the marking of the signal employed in FIG. 2A with pitch markers (top row) leading to the determination of the phase of the analytical signal (bottom row)

Analysis of doubling of the period duration can be effected as illustrated in FIG. 5, beginning as shown in the topmost panel by applying pitch markers to the speech signal, using for example Praat pitch marker software available from www.praat.org. In FIG. 5, each panel shows the change of signal phase from $\pi$ to $-\pi$ with respect to time. Descending through the six panels the removal of tongue and mouth effects from the speech signal leaving the glottal effects of air on the vocal chords can be seen. The bottom panel shows the phase change to be regular throughout much of the glottal signal.

Methods for Predicting Acoustic Unit Paths to be Synthesized as Continuous Prosodic Speech In some aspects of the inventive method, each unit in the acoustic data base can be identified using its prosodic phonetic unit name, its linguistic feature classification according to the text where the acoustic unit is located, and its directly measured acoustic features, computational representations or extensions thereof. In each case, the name, linguistic features, or acoustic features can be considered to be properties of the unit. These methods of identification and classification are:
(1) By prosodic phonetic unit name and other linguistic features directly derivable from the prosodic phonetic unit name. (prosodic phonetic units having the same name also have the same linguistic features. For example, a prosodic phonetic unit may be an unvoiced plosive, or it may be a front vowel with a pitch level of 3.);
(2) By sub- and supra-segmental linguistic features such as rising and falling pitch levels, co-articulations, rhythms, and stresses that derive from the position of a particular prosodic phonetic unit in the sequence of preceding and following prosodic phonetic units in the word, phrase, sentence, or paragraph to be pronounced or synthesized according to prosodic patterns or rules. These sub- and supra-segmental features can be determined by parsing the linguistic tree of the word, phrase, sentence, or paragraph for each prosodic phonetic unit thereby identifying the specific linguistic context for the prosodic phonetic unit and adding the information about the feature to the identity of the acoustic unit corresponding to the prosodic phonetic unit (Linguistic features such as phrase final, coda, prosodic phonetic unit "p" (prior) is a fricative, prosodic phonetic unit "n" (next) is a sonorant, etc., are examples of this type of linguistic context identification feature applying to the prosodic phonetic unit),
(3) By acoustic related features that are measured acoustic parameter wave data directly related to a specific unit in the acoustic database (e.g., pitch F0, MFCCs, energy, duration, etc.) and corresponding to the specifically named prosodic phonetic unit and its identified linguistic context.

To synthesize a specific text, the text can be run through an automated prosody labeling engine. An example of a suitable prosody labeling engine is disclosed in patent application Ser. No. 12/188,763. Once the text is labeled with prosodic phonetic units, the unit selection process for synthesis can begin. In the unit selection process for synthesis each prosodic phonetic unit can be associated with its specific bundle of feature values, both linguistically as text and acoustically as wave data. Features can be predicted by the front end parsing engine's analysis of the linguistic parsing tree according to prosodic patterns or rules. The combined set of linguistic and acoustic features desired for a specific prosodic phonetic unit in a specific location in a sequence of prosodic phonetic units is referenced herein as "the target feature bundle".

For every specific prosodic phonetic unit to be synthesized this target feature bundle can be compared against the linguistic and acoustic features of possible candidate units contained in the acoustic database. The acoustic database contains a unique identifier for each candidate unit, along with categorical values for its associated linguistic and acoustic features. From the acoustic database the more important of these features can be used as pre-selection criteria, because there may be relatively few units in the database that will exactly meet all of the criteria expressed in the target feature bundle.

This database query can return a larger number—Nc—of candidate units, for example, the upper limit of Nc can be set to a number such as 500, if desired, or to another suitable value. The target cost of each of the candidates can be computed based on a linguistic feature hierarchy. Alternatively, if the system is not constrained to a limited number of likely candidates, a specific measure of "badness" can be calculated for every candidate unit in the database. Units with close to ideal linguistic features can have target costs of close to zero, and units with no matching linguistic features in terms of sound and linguistic context can have high target costs.

As an alternative to working with a single unified prosodic phonetic space, methods and system embodiments of the invention can subdivide a population of prosodic phonetic units into multiple classes each of which has one or more feature hierarchies. In one example, 11 different classes with 11 different feature hierarchies can be used. Other suitable numbers of classes and hierarchies can also be employed, as will be, or become, apparent to a person of ordinary skill in the art, for example, from 2 to about 50 classes with each class having from 2 to about 50 different feature hierarchies. If desired, from 5 to about 20 classes can be employed with each class having from about 5 to about 20 different feature hierarchies.

In a relatively robust (non-sparse) database, the additional specificity provided by multiple hierarchies (essentially strictly separating candidate selection spaces) has no impact on the units selected. In one example employing a population of 600 prosodic phonetic units, there could be as many as 360,000 plus different hierarchies, i.e. a different hierarchy for every possible prosodic phonetic unit adjacency (600 prosodic phonetic units×600 prosodic phonetic units). It can be expected that additional hierarchies for more segmented classes (or additional hierarchy depth and specificity in the case of a single unified hierarchy) will improve synthesis quality, but the number of hierarchies in any real system will be relatively small. The feature hierarchy determines the weights associated with each feature mismatch. If a feature is high in the hierarchy, a candidate unit can be penalized with a high cost when the feature for that specific candidate unit is different from the desired target feature, while feature mismatches lower in the hierarchy may be penalized to a lesser extent. This step of the evaluation yields a list of unit candidates (up to Nc in total) which can be rank ordered by sorting according to increasing target cost. Thus, the best matches representing the lowest target cost come first, and the worse matches are near the end of the list and have high target costs (or penalties).

A person of ordinary skill in the art will understand that many methods can be used to derive a suitable target cost from the categorical linguistic features. One such method will now be described by way of example and without limitation.

Establish multiple categorical hierarchies such as the example shown below for Coda Sonorants:
1.1. Coda Sonorants
   1.1.1. Non-phrase-final, next sound is NOT a sonorant
   1. Current_Syllable_Stress (value of 0-2 based on three states: stressed, unstressed, NA)
      Current_Syllable_Pitchlevel (value of 0-3, or 6, based on four states: 1, 2, 3, NA)
      Current_Syllable_Inflectiontype (value of 0-3 based on seven states: none, upglide, downglide, up circumflex, down circumflex, level sustained, NA)
   2. Previous_PPU*_Articulationplaceandmanner (value of 0-4, or 16, based on system of 17 possible states of articulation place and manner)
      Previous_PPU_Vowelheight (value of 0-3 based on four states: high/mid/low/NA)
      Previous_PPU_Vowelfrontness (value of 0-3 based on four states: front/central/back/NA)
   3. Next_PPU_Articulationplaceandmanner (value of 0-4, or 16, based on system of 17 possible states of articulation place and manner)
   4. Segment_Cluster (value of 0-2 based on three states: part of consonant cluster, not part of consonant cluster, NA)
   5. Next_Syllable_Stress (value of 0-2 based on three states: stressed, unstressed, NA)
      Next_Syllable_Pitchlevel (value of 0-3 based on four states: 1, 2, 3, NA)
      Next_Syllable_Inflectiontype (value of 0-3, or 6, based on seven states: none, upglide, downglide, up circumflex, down circumflex, level sustained, NA)
   6. Previous_PPU_Name (value of 0-1 based on 2 states: match, no match)
   7. Next_PPU_Name (value of 0-1 based on 2 states: match, no match)
Prosodic Phonetic Unit This hierarchy only deals with coda sonorant sounds that are non-phrase final, where the next following sound is not a sonorant. There are seven levels in the hierarchy, with the linguistic features in level 1 always more important than the linguistic features in level 2 and below. In other words, a candidate where the current syllable stress matches the desired syllable stress (a level 1 feature), and nothing else matches in level 2 and below, is preferred to another candidate where nothing matches in level 1, and everything matches for all features at level 2 and below.

As can be seen from the outline above, this hierarchy does not need to be strict, and can have multiple linguistic features on the same level of the hierarchy. To determine a target cost, each possible candidate can be compared against the desired optimal values for each candidate. The ideal candidate has a linguistic target cost of zero. In the example provided in Table 1, below, the highest level of the hierarchy is level 1, and the lowest level of the hierarchy is level 7. This table represents one useful way of practicing a target cost penalty method according to the invention. The penalties that are added to the target cost at a specific level for each mismatch are based on being one penalty value higher than the maximum penalty value possible if there is complete mismatch at all lower levels in the hierarchy. This method of assigning target penalty values ensures that the categorical feature preferences represented in the hierarchy are fully preserved in the target cost ranking. In other words, for this example hierarchy, the resulting penalty target values rank order the candidate units in terms of linguistic feature preference from zero—all linguistic features match, to potentially 1476—no linguistic features match.

TABLE 1

Exemplary penalty cost structure to convert hierarchical linguistic categories into target costs

| Hierarchical Level | Number of Linguistic Features on Level | Total Number of States on Level | Cost of Single Feature Mismatch at Specified Level | Cost of Maximum Mismatch at Specified Level | Cost of All Features Mismatching at Specfied Level and Below |
|---|---|---|---|---|---|
| 1 | 3 | 11 | 368 | 1109 | 1476 |
| 2 | 3 | 14 | 90 | 278 | 367 |
| 3 | 1 | 6 | 43 | 47 | 89 |
| 4 | 1 | 3 | 21 | 22 | 42 |
| 5 | 3 | 11 | 4 | 17 | 20 |
| 6 | 1 | 2 | 2 | 2 | 3 |
| 7 | 1 | 2 | 1 | 1 | 1 |

The approach outlined above, and similar approaches that can be implemented through tiered confusion matrices, and using other methods known to those skilled in the art, ensure that all of the linguistic preference information captured in the hierarchy can be retained in the single target cost number.

The example above is not a strict hierarchy in that linguistic features that are on the same level can be traded against each other. For instance, on level 2 of the example, previous prosodic phonetic unit vowel height and previous prosodic phonetic unit vowel frontness are equally important, so two candidate units with identical linguistic features except for previous prosodic phonetic unit vowel height and frontness would have identical target costs if one candidate unit matched on previous prosodic phonetic unit vowel height and mismatched on previous prosodic phonetic unit vowel frontness, and the other candidate unit matched on previous prosodic phonetic unit vowel frontness and mismatched on previous prosodic phonetic unit vowel height. Uneven trading ratios are also possible, linguistic features on the same level do not have to have the same penalty value for a mismatch.

The acoustic database can be extended by including certain measurable acoustic features that are associated with each specific prosodic phonetic unit candidate. These measured acoustic features can be understood as quantitative representations of perceptual properties for a specific prosodic phonetic unit candidate. Since acoustic features typically change over time, the various acoustic features for prosodic phonetic unit candidates to be sequenced as synthesized utterances may also be seen as parameters that describe quantified path segments in the acoustic feature space. For each acoustic feature, one may develop a mathematical model by calculating a smoothed polynomial or other representation, using one of the various curve fitting methods (e.g. initial and final values as well as rates of change vectors for Hermite splines, or ten point samples over the duration of the prosodic phonetic unit candidate). Modeling may be implemented in many ways. One way, in order to speed computation during speech synthesis, would be to calculate curve coefficients for each prosodic phonetic unit candidate ahead of time and store it as appended data in the database, so as to be simultaneously retrieved with the linguistic feature data and other acoustic metrics for the wave data of the specific prosodic phonetic unit candidate.

The correspondence between linguistic features of prosodic phonetic units, which are categorical, and acoustic features of uttered speech, which are quantitative and measurable, may only be exactly known for the acoustic units actually in the acoustic database of recorded sounds. Pursuant to a method aspect of the invention each acoustic unit waveform in the database can be labeled with a prosodic phonetic unit name plus linguistic features relevant to the acoustic unit. Similarly, the derived acoustic feature vectors comprising F0, spectral coefficients as represented by MFCC's or other methods, duration, energy, and other acoustic parameters, can also be measured and stored in the database, or they can be computed ad-hoc from the wave data as needed.

In prosodic synthesis there are also occurrences where one enters plain text to be synthesized as speech but none of the acoustic unit candidates directly corresponds to the ideal linguistic features for a particular prosodic phonetic unit, or a sequence of prosodic phonetic units. In such circumstances various modifications of the acoustic wave signal for an individual prosodic phonetic unit, or sequence of prosodic phonetic units, can be undertaken so that the perception of the synthesized utterance closely approximates smooth and continuous speech. Often there is a general correspondence between linguistic features and acoustic feature vectors and this relationship can be quantified or unquantified.

For example, if one were to synthesize the initial short "a" in "away", as contained in the sentence "We were away a week", one would begin searching among all short "a" candidates in the population of candidate sounds, or acoustic units, stored in an acoustic database. All forms of short "a" have "N4" as the initial orthographic item in the extended prosodic phonetic unit name that is used to identify the corresponding acoustic unit in the acoustic database. FIGS. 6-11 show the results of various approaches to identifying acoustic unit candidates for synthesizing prosodic human speech in a population of acoustic units.

Figure 6:
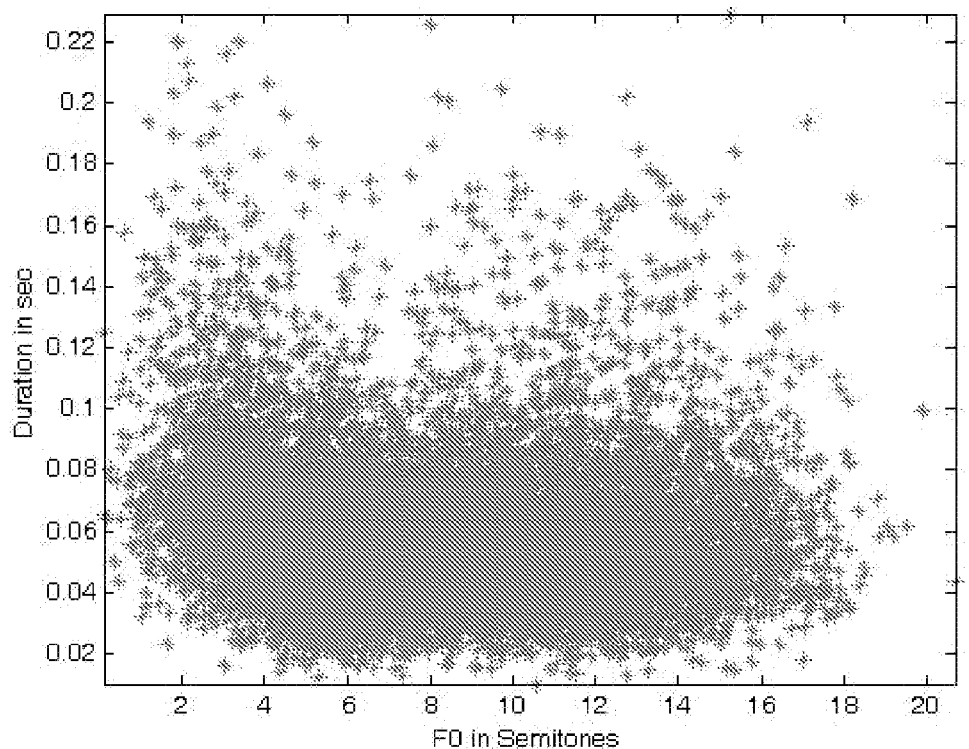
FIG. 6 is a graphical depiction of the distribution with respect to frequency plotted on the abscissa and duration plotted on the ordinate of an available candidate population of prosodic phonetic units to represent the leading "a" of the word "away" in the phrase "We were away a week"

As can be seen from FIG. 6 such a prosodic phonetic unit description is too general and therefore insufficient to predict the desired acoustic features for concatenation with much accuracy.

FIG. 6 shows the distribution of a base prosodic phonetic unit, labeled as 'N4' for a short 'a', across all of three pitch levels, low L1, medium L2 and high L3 employed as an approximate measure of pitch, tonalities low iL, and high iH, employed as an approximate measure of intensity, and duration. The result is that there is insufficient information to predict suitable prosodic phonetic unit pitch and duration for representing or matching with the acoustic unit to be synthesized, the short "a".

Figure 7:
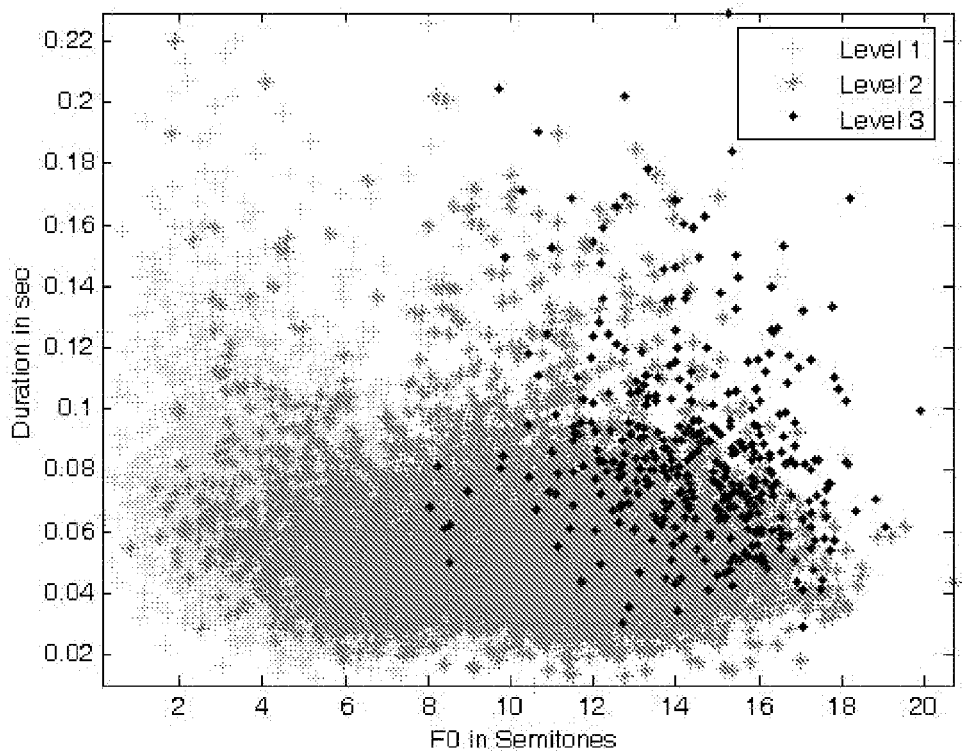
FIG. 7 is a view similar to FIG. 6 wherein the population of prosodic phonetic units is segmented by pitch level.

One can further classify and distribute the acoustic units according to their more specific prosodic phonetic unit names. FIG. 7, shows the distribution of all base 'N4' prosodic phonetic units further classified by their level of pitch (F0) according to levels 1, 2, and 3, using different symbols with different grayscale values to indicate prosodic phonetic units having the respective pitch level, as shown in the key in the upper right hand corner of the figure. Similar keys are shown in each of FIGS. 8-11. Since pitch is a perceptual measure, and is dependent upon linguistic context, there is substantial overlap among the L1, L2 and L3 labels for the prosodic phonetic unit N4. Again, there is insufficient information to predict prosodic phonetic unit pitch and duration using pitch level.

Figure 8:
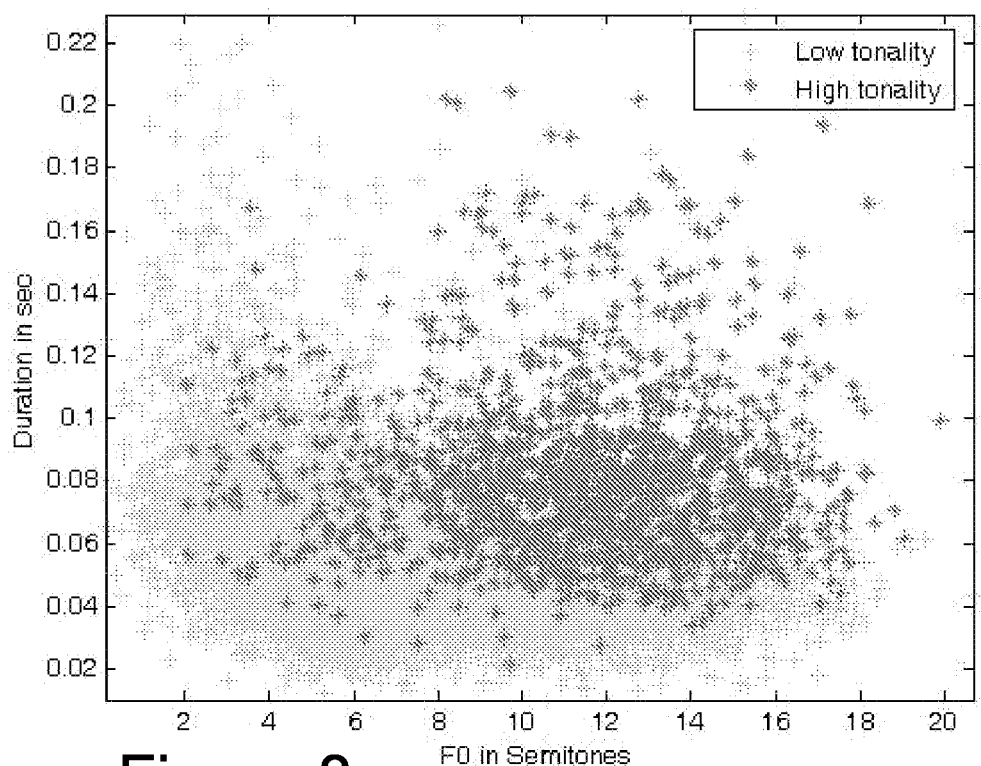
FIG. 8 is a view similar to FIG. 6 wherein the population of prosodic phonetic units is segmented by tonality.

One can also reclassify and distribute the base prosodic phonetic unit N4 according to low or high tonality, as shown in FIG. 8. An examination of the distribution of prosodic phonetic unit N4 by tonality (iL, iH) as shown in FIG. 8, indicates substantial overlap, and again the information is not sufficient to make an accurate prediction of the desired pitch and duration.

Figure 9:
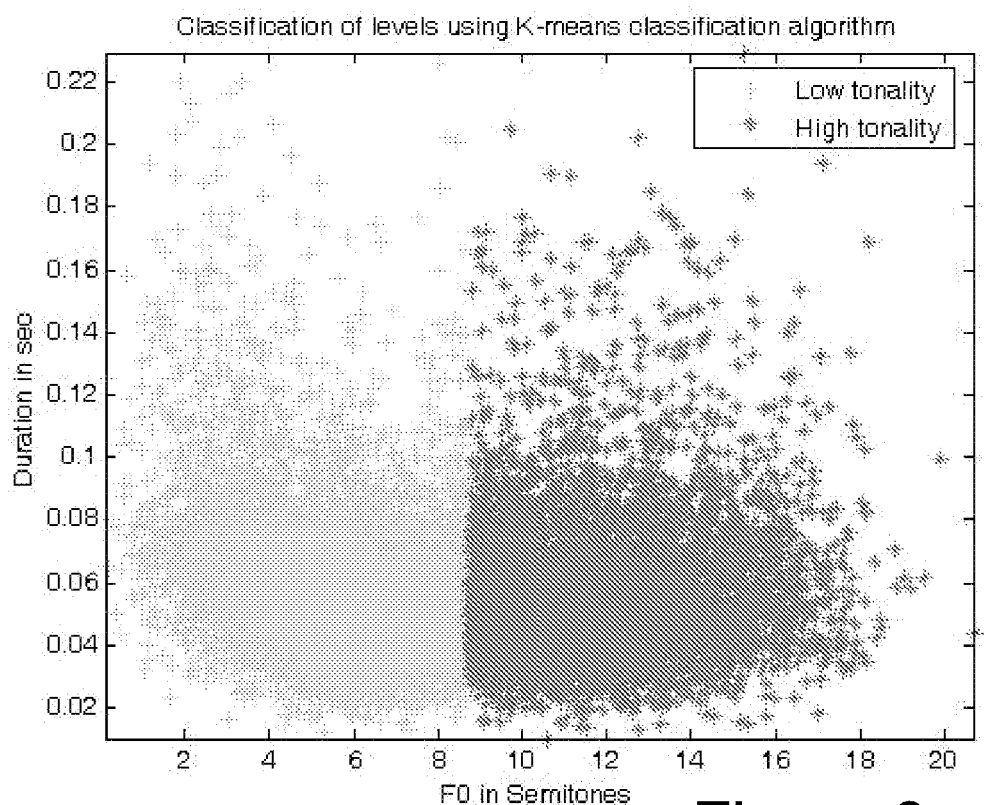
FIG. 9 is a view similar to FIG. 8 wherein the population of prosodic phonetic units is reclassified using a machine technique.
Figure 10:
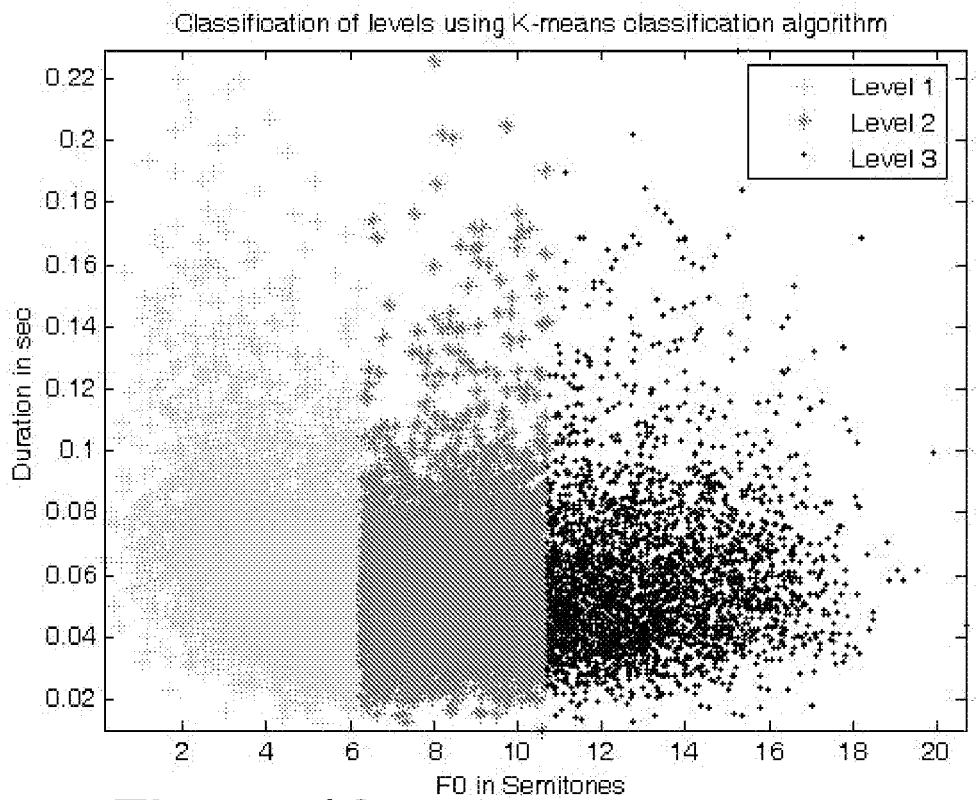
FIG. 10 is a view similar to FIG. 7 wherein the population of prosodic phonetic units is reclassified using a machine technique.

Such overlap problems might theoretically be addressed by various machine reclassification techniques. However, as shown in FIGS. 9 and 10, one of these techniques, reclassification with a K-means classification algorithm, also fails to increase the amount of prediction accuracy that can be derived from the acoustic database.

Acoustic Unit Candidate Identification and Selection Using Linguistic Feature Sets Pursuant to the methods of the invention, a combined linguistic feature set for a specific prosodic phonetic unit can be used in creating a statistical model for identifying candidates in terms of acoustic unit feature values for example fundamental frequency (f0), mel frequency cepstral coefficient (MFCC), duration, energy, etc. and, can in turn, use the weighted mean values of the identified candidates to predict acoustic feature values for an optimal candidate. This model may be created separately from, or concurrently with, the synthesis process. Such a method of using linguistic parameters automatically derived from plain text to be synthesized as speech can result in a more accurate or precise prediction as is shown in FIG. 11.

Figure 11:
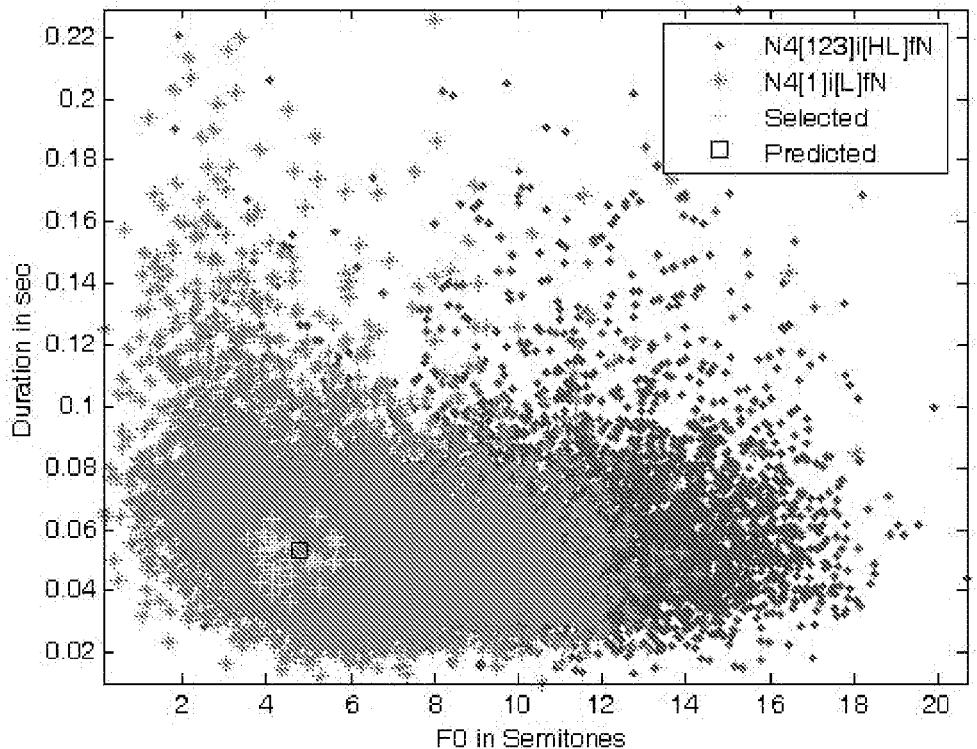
FIG. 11 is a view similar to FIG. 6 wherein a combination of linguistic features is used to classify the population of prosodic phonetic units, according to a method embodiment of the invention.

Like FIGS. 6-10, FIG. 11 portrays the distribution of all short 'a' vowels in the acoustic database. The base prosodic phonetic unit name beginning with 'N4' is substantially equivalent to a short 'a.' Taken together, the data in FIG. 11 are similar to what is shown in FIG. 6

However, the portion shown as black dots in FIG. 11 represent all short 'a' vowels in the acoustic database that do not have the desired L1 pitch level and iL Tonality; this black mass extends under the area of dark gray asterisks. The dark gray area represents base N4 prosodic phonetic units having the desired L1 pitch level and iL Tonality. The light gray crosses represent the dark gray candidates that appear to be the best N4 candidates based on the further application of categorical linguistic features for the specific prosodic phonetic units. The black square represents the weighted mean prediction using the best twenty candidates that are shown as light gray crosses.

This method, which, as stated, is useful for generating data such as are shown in FIG. 11, is further described below with reference to FIG. 12. However, simpler, order-based methods, or other weighting methods based on a linguistic hierarchy, can be employed to predict target acoustic unit parameters if desired. One example of a relatively simple weighting method is as follows:

Retrieve a large list (e.g. 500) of candidates from the database based on a linguistic hierarchy or other preference method.
Rank order the candidates by order of preference.
Select a reasonable number of the top candidates (e.g. 20)
Weight each candidate by its rank order.
Retrieve the specific acoustic parameters associated with each of the candidates (e.g. F0, MFCC's, Energy, Duration).
Calculate a weighted ideal target value for each acoustic parameter based on the rank-order weighted mean (In the case of 20 candidates, this will give the top candidate a 9.5% weight, and the 20$^{th}$ candidate a 0.5% weight in calculating the mean).

A sufficiently large acoustic unit database with limited empty sets at the bottom of the linguistic hierarchy can also enable some of these simple weighting methods to be done ahead of time so that each candidate prosodic phonetic unit can be assigned to a specific small selection bin, with specific synthesis candidates selected based on a table lookup.

One aspect of the invention employs a speech synthesis system that can use a more complex prosodic phonetic unit-based candidate prediction to build an optimization, in which heuristics can be first used to obtain statistical parameters about good or best candidates for each prosodic phonetic unit of a sentence to be synthesized, and then an optimal trajectory of feature vectors through the acoustic feature space can be calculated. An example of such a statistical model which can be utilized for providing the results shown in FIG. 11, as will be, or become, apparent to a person of ordinary skill in the art, will now be described.

A fraction of the best scoring candidates in the candidate list can be selected and weighted sample means of the acoustic feature vectors can be calculated. A starting list of Nc candidates (typically Nc=500, or fewer if there are not enough candidates) can be rank ordered according to their target cost, which depends on the differences between the set of target features and the actual features of each candidate in the database. A fraction M of the highest ranking of the candidates, identified as having lowest target costs, can be chosen to estimate statistical moments. First the target cost can be converted into a number that has the properties of a probability measure, representing the likelihood of being the best candidate. If c is the cost of a candidate a weight that is inversely proportional to c, for example a weight $w=1/(1+c^2)$, can be computed for each candidate. Other similar logistics functions which result in the calculated weight being inversely proportional to c can also be used to derive the appropriate weights. The weights are normalized so that they sum up to 1:

$$\sum_{i=1}^{M} p_i = 1 \qquad \text{(Eq. 7)}$$

Indicating the acoustic feature vector of the i-th candidate as f and $p_i$ its probability, the expected mean $\hat{f}$ and covariance C of the acoustic feature of the prosodic phonetic unit can be computed as follows:

$$\hat{f} = \sum_{i=1}^{M} p_i f_i \text{ and } C = \sum_{i=1}^{M} p_i (f_i - \hat{f})(f_i - \hat{f})^T \qquad \text{(Eq. 8)}$$

Furthermore, to represent correlations between subsequent prosodic phonetic unit candidates in two consecutive positions, denoted a and b, an (asymmetric) covariance between the acoustic features of the consecutive prosodic phonetic units can be calculated, as follows:

$$C_{ab} = \sum_{i=1}^{M_a} \sum_{j=1}^{M_b} p_{ij} (f_{a,i} - \hat{f}_a)(f_{b,j} - \hat{f}_b)^T \qquad \text{(Eq. 9)}$$

Hereby the probability $p_{ij}$ is non-zero only if the pair of two units (i,j) is connected, so the summation is taken only over the pairs of connected units, in which case the probability is the product of the probabilities of each units, i.e. $p_{ij}=p_i p_j$. For a typical constrained size database, all other covariance matrices of higher order that may exist between not directly adjacent prosodic phonetic units can be ignored and assumed to be zero, since, in some cases, few examples may be found in the database to estimate these covariance matrices.

The complete covariance matrix for all acoustic features of a sentence with L prosodic phonetic units can thus be obtained as a block tri-diagonal matrix, representing all first order covariances of direct neighbors on the off-diagonal and the intra-prosodic phonetic unit covariances on the diagonal:

$$C = \begin{pmatrix} C_{11} & C_{12} & & & & \\ C_{21} & C_{22} & C_{23} & & & \\ & C_{32} & C_{33} & \ddots & & \\ & & \ddots & \ddots & & \\ & & & & C_{L-1,L-1} & C_{L-1,L} \\ & & & & C_{L,L-1} & C_{LL} \end{pmatrix} \qquad \text{(Eq. 10)}$$

The expected sequence of feature vectors is a column vector obtained by stacking the prosodic phonetic unit specific feature vector expectations together:

$$\hat{f} = (\hat{f}_1, \hat{f}_2, \ldots, \hat{f}_L)^T \qquad \text{(Eq. 11)}$$

At a join between two prosodic phonetic units, the expected feature values may be discontinuous, since they are only computed from the statistics for each candidate list separately. However, for the acoustic features, with the exception of duration and other similar acoustic parameters where the measurement may be only valid for the acoustic unit as a whole, continuity may be required when switching from one prosodic phonetic unit to the next. Therefore, a smooth optimal feature trajectory can be computed by an optimization. A useful objective, for the purposes of the present invention is to identify a feature sequence vector which for each segment is close or closest to the segment mean but is at the same time continuous at the joins. For this purpose, the differences can be weighted with the inverse covariance matrix C. A solution can be obtained by solving a system of equations of the following form:

$$C^{-1}f + F^T\lambda = C^{-1}\hat{f}$$ (Eq. 12)
$$Ff = 0$$

In equation 12, the optimal feature vector is now denoted as f. It contains the optimal feature vectors for each prosodic phonetic unit in the sentence. The matrix F represents the constraints; it is a sparse matrix containing only 1 and −1 values which is used to express the constraints in the system, and $\lambda$ represents a vector of Lagrange multipliers, one for each constraint. The solution to the above system of equations, Eq. 12, can be found by eliminating $\lambda$ and solving for f. This can be formally written as:

$$f = \hat{f} - CF(FCF^T)^{-1}F\hat{f}$$ (Eq. 13)

It is possible to extend this method to include other external constraints by a combination of two methods: Algebraic constraints, in which a part of the optimal feature trajectory is prescribed to go through a specified target, can be taken into account by extending the constraint matrix F and using a non-zero vector in the right hand side of the 2" equation of Eq. 12. Other constraints that can be represented by the requirement to minimize additional quadratic functions, can be formalized by modifying and extending the matrix C and the right hand side of the first equation of Eq. 12.

Once the feature vectors for the optimal trajectory through the feature space are known, each candidate can be evaluated against the optimal trajectory. Target cost can now be calculated as the distance between the candidate's feature vector and those of the optimal trajectory, and join cost can be computed by computing the distance of a pair of adjacent candidates, to the left and right of each join, relative to each other. In all distance measures, the weights can be obtained from the inverse of the covariance matrix between the relevant variables, which are part of the global covariance matrix. If this covariance matrix is denoted as D, the inner product of a vector of feature differences becomes the distance between two feature vectors $f_a$ and $f_b$ for consecutive prosodic phonetic units:

$$dist(f_a, f_b) = (f_a - f_b)^T D^{-1}(f_a - f_b)$$ (Eq. 14)

For ease of illustration, only F0 and duration parameters in the path computation and cost calculations can be used. For a full target or optimal path prediction, additional measurable acoustic parameters such as energy, MFCCs, etc., can be included. Thus, referring to FIG. 12, each feature vector f includes or consists of, the beginning and ending F0 value and rates of change for F0 values, as well as the duration of the segment. Continuity between two segments can be enforced for the F0 values and rates of change of F0. In FIG. 12. thin dotted lines represent the M candidate trajectories. The thick gray segments are the mean trajectory segments for each set of M candidates. The thick black line is the estimated optimal trajectory.

Figure 12:
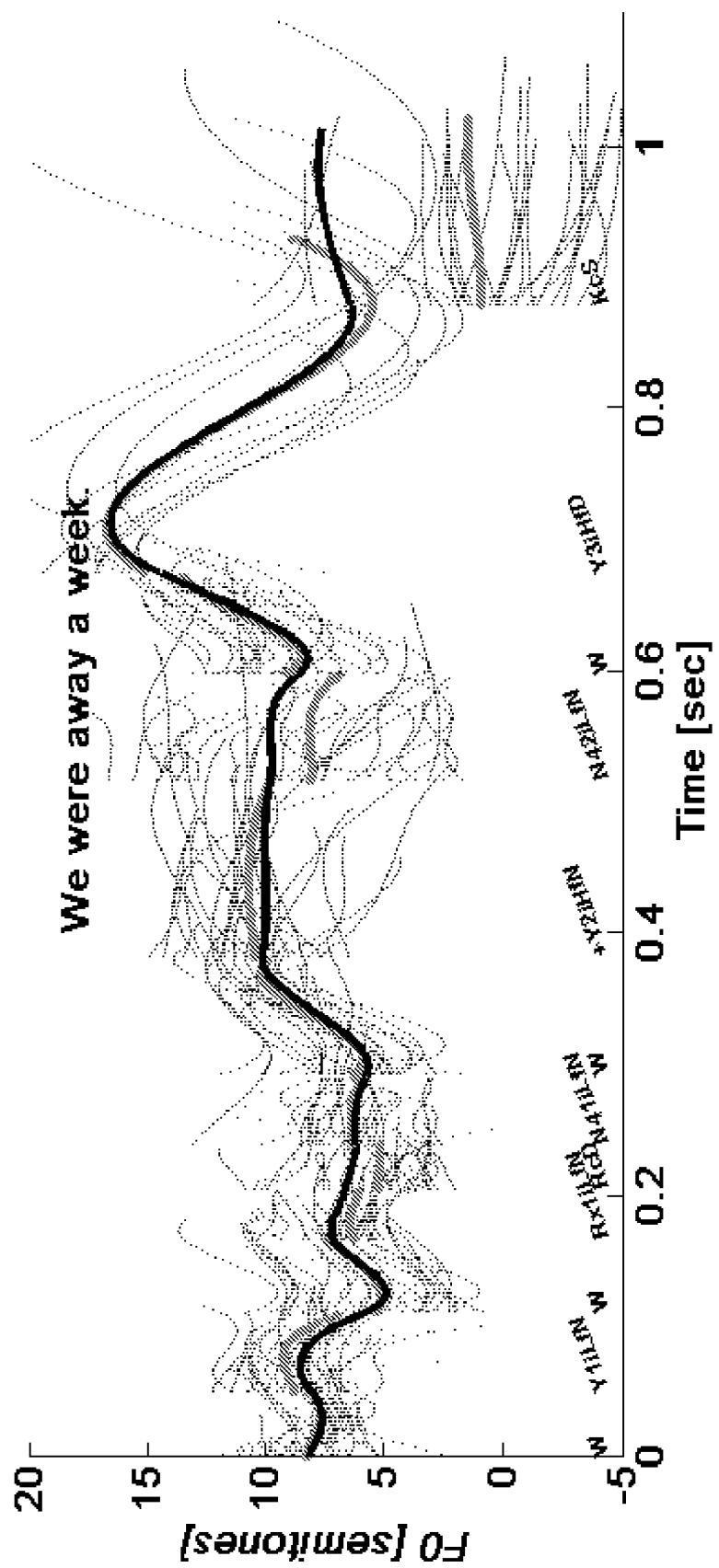
FIG. 12 is a graphical depiction of an acoustic unit pathway through acoustic space for the phrase "We were away a week" exemplifying a further embodiment of the methods of the invention.

An example of a suitable procedure for a particular synthesized utterance "We were away a week" is shown in FIG. 12. Referring to FIG. 12, the first 25 candidate trajectories for F0 are shown as thin dotted lines. The mean trajectories, obtained as weighted average of the spline coefficients over each ensemble, are shown as thick gray discontinuous line segments. The continuous thick black line represents the estimated optimal combination of the trajectory segments which is continuous at the joins.

Figure 13:
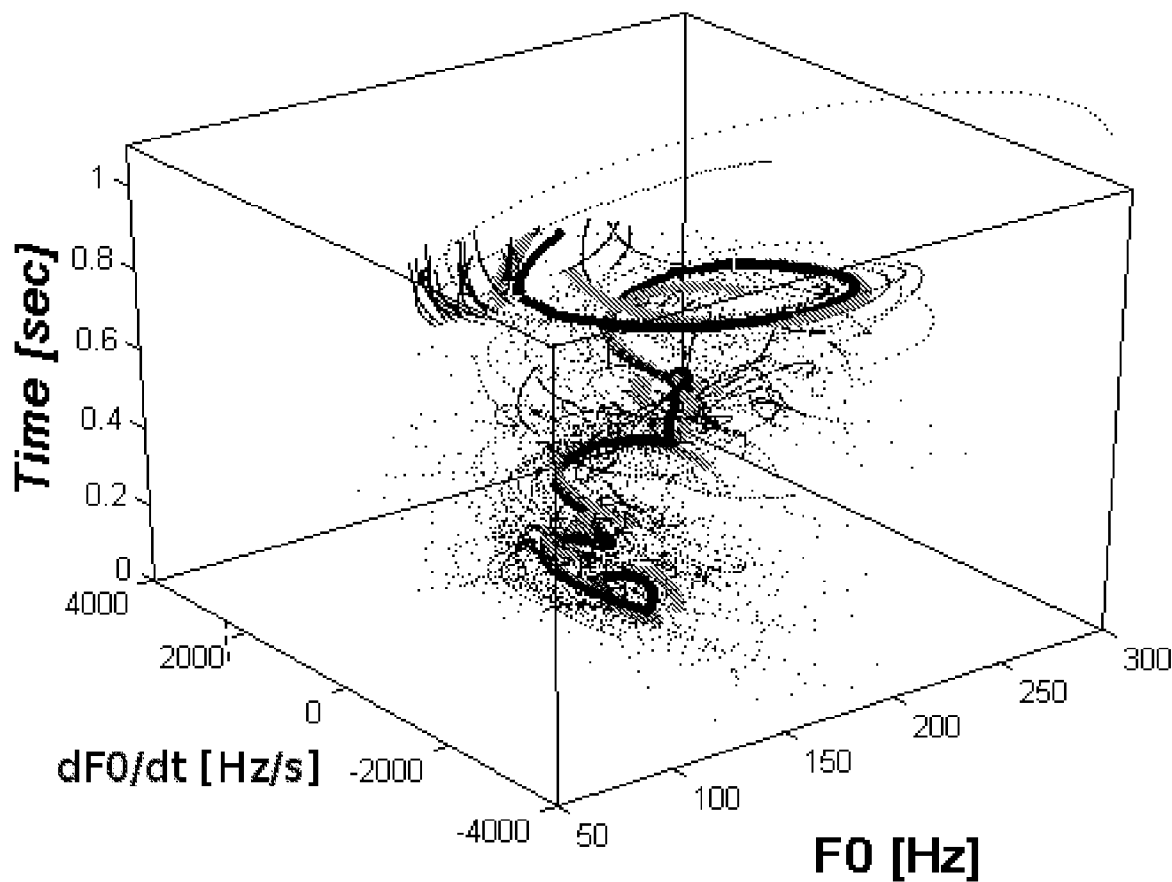
FIG. 13 is a three-dimensional graphical depiction of the acoustic unit pathway shown in FIG. 12.

In FIG. 13, possible results from this procedure are illustrated in a three-dimensional space-time representation in which the x and y axes are F0 and the rate of change of F0 in the xy plane, while the third z axis represents time as a third dimension. Thin dotted lines represent candidate trajectories; thick discontinuous grey lines represent the weighted mean of each set of candidate trajectories, and the continuous thick black line represents the estimated target or optimal trajectory.

A general procedure for creating local models of the mapping from feature bundles to acoustic feature space may be extended to the case of missing or sparse data. If for a given prosodic phonetic unit only a few candidates exist, say 5 or even just one, reliable predictions about acoustic feature vectors from just a few examples cannot be made. However, if it is possible to make a reliable prediction of a particular acoustic feature, such as F0 contour or energy for a "similar" prosodic phonetic unit, or a set of prosodic phonetic units, this information can be used either to optimally select from the sparse number of candidates, or as a method of predicting the desired acoustic features for possible modifications of an existing prosodic phonetic unit. For example, given that here are only 3 examples of a particular vowel in a given segmental and prosodic context, the estimate of a salient acoustic feature, such as F0 or energy, can be based on a likely larger set of examples where similar vowels can be found in the same context.

A strategy of relaxing from a given prosodic phonetic unit to a more general class of prosodic phonetic units can follow a predefined feature hierarchy which can be specified separately. In a preferred hierarchy approach, the intrinsic features of prosodic phonetic units can be organized in a tree, in which the terminals or leaves are specific prosodic phonetic units in a specific linguistic context. Relaxing a feature criterion then means going up in the tree from a given position. The highest point in the linguistic feature hierarchy tree discriminates the most important linguistic feature, in other words a candidate not matching that specific desired linguistic feature may be unlikely to produce acceptable synthesis. The lowest non-matching point in the linguistic tree, one level above the terminal or leaf level may produce acceptable synthesis, possibly even if it does not match the desired linguistic feature attributes. The hierarchy does not need to be strict, different linguistic features can be at the same level of the hierarchy. In some linguistic contexts and for a limited set of prosodic phonetic unit classes, it may also be possible to substitute one prosodic phonetic unit for another. Effectively, this means that the candidates used for acoustic feature prediction, and the candidates used for prosodic phonetic unit selection do not necessarily need to be contained in the same space.

Each acoustic unit in the database has as properties, in addition to its own linguistic features and measured acoustic unit values, the linguistic features, and measured or modeled acoustic unit values for the prosodic phonetic unit that is prior to it in continuous speech (prosodic phonetic unit "p") as well as for the prosodic phonetic unit that is next (prosodic phonetic unit "n"). This allows one to use weighted change in pitch, duration or energy (or other acoustic measures) for candidates based on the acoustic data for prosodic phonetic unit "p" (prior) and prosodic phonetic unit "n" (next) in their original continuous speech context to predict how much a specific candidate should change relative to the unit at the end of the path to which it will be concatenated. If desired, this concept can be extended so that each acoustic unit has as properties, in addition to its own linguistic features and measured acoustic unit values, the linguistic features, and measured or modeled acoustic unit values for the prosodic phonetic unit that is two or more positions prior to it in continuous recorded speech in the database, as well as for the prosodic phonetic unit that is two or more positions following it in the continuous recorded speech in the database. These relative properties of a unit can also be based on the properties of a preceding and/or following syllable, word, phrase, sentence, or paragraph.

Methods of Modifying Segments of Uttered Speech Data to Create Acoustic Unit Pathways for Synthesizing Continuous Prosodic Speech In some cases, it can be expected that even after the best candidates have been selected according to their proximity to the optimal path, the acoustic features may still be too discontinuous at the joins. For some of the acoustic features, in particular, F0, energy and duration, the optimal trajectory can be used as a control signal. For example, if for two adjacent units F0 jumps by more than a small predetermined quantity (e.g. ½ semitone) one may compute a reference trajectory for F0 and modify both units accordingly. Or, if the duration of a single unit differs significantly from the target duration, it may be elongated or shortened, using the information from the optimal trajectory. There are many tools for effecting such changes. For example, the Burg lattice filter can be employed for analysis of the speech signal. However suitable analyses can also be accomplished by other methods such as LPC, et. al., if desired. Below, one exemplary set of procedures according to the invention for changing pitch and duration for voiced speech signals, in particular, is outlined.

Figure 14:
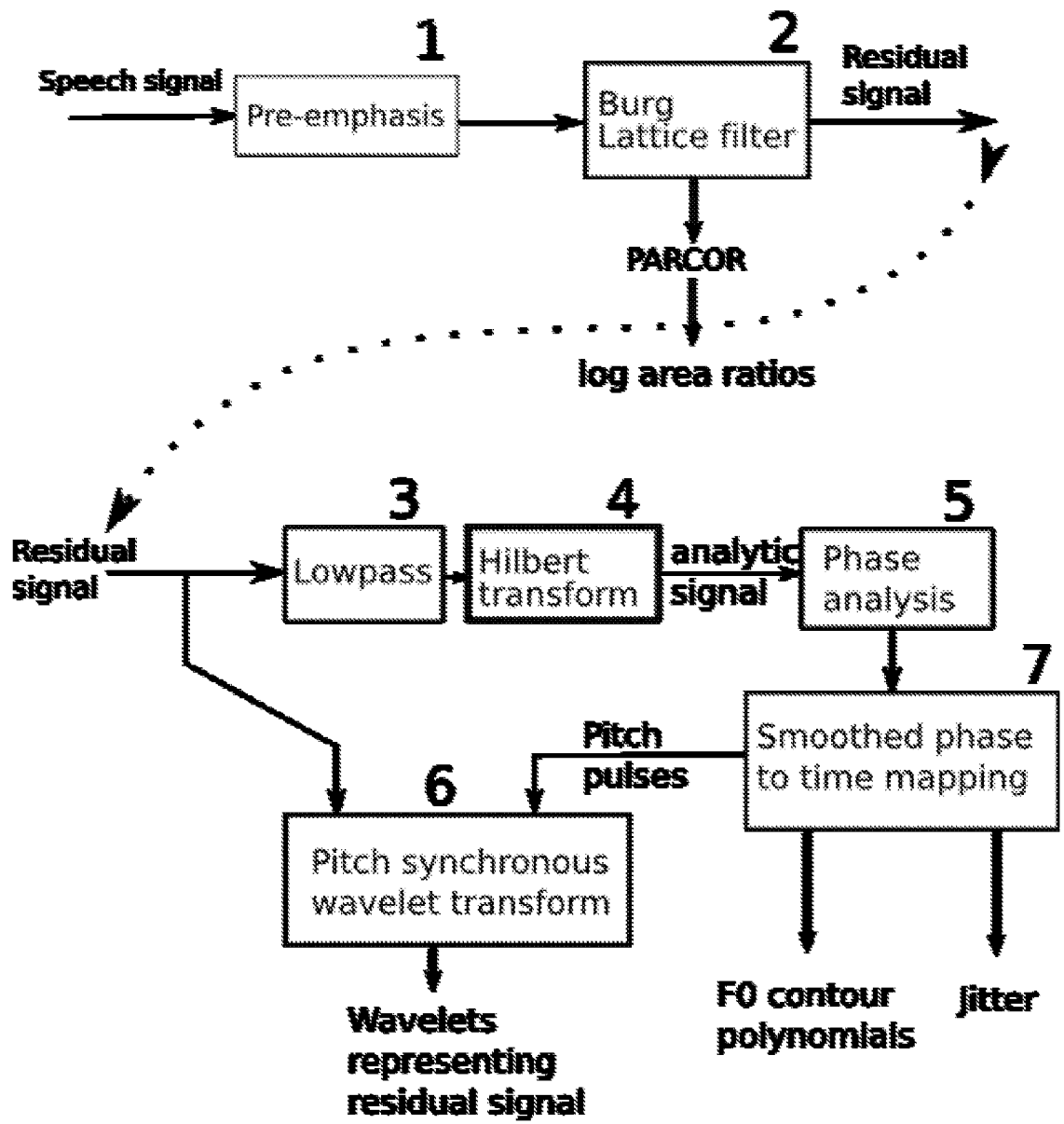
FIG. 14 is a block flow diagram illustrating one embodiment of a speech signal analysis method according to the invention.

The speech signal analysis method illustrated in FIG. 14 is one example of a useful method for separation of voice source and vocal tract properties. Referring to FIG. 14, the speech signal, after being sent through a pre-emphasis filter (1) to boost higher frequencies for better spectral estimation, is subsequently analyzed in a Burg lattice filter (2), which splits the signal into a set of slower varying partial correlation coefficients ("PARCOR" in the drawing figures) and a residual signal that may contain information on the voice source.

The partial correlation coefficients, which for the case of vowels have a physical meaning as reflection coefficients (in terms of a one-dimensional acoustic model of the vocal tract as a tube consisting of a number of uniform segments of equal length with varying cross-sections, in which acoustic waves are traveling back and forth and are reflected at segment boundaries). The partial correlation coefficients or reflection coefficients $r_k$ may be converted into logarithmic area ratios $A_k$ by means of the transformation shown in equation 15:

$$A_r = \log\frac{1 + r_k}{1 - r_k} \quad \text{(Eq. 15)}$$

This relationship between reflection coefficients and log area ratios (LARs) holds independently of the physical interpretation, and it has been shown that LARs are sometimes better suited for interpolation than reflection coefficients directly. This representation can be used for signal modifications. The residual signal can be further analyzed, see FIG. 14, following the dashed arrow: First, phase information about the signal can be obtained by using a low pass filtered version (3) of the signal, from which the fundamental frequency can more easily be obtained. The phase information associated with the low pass filtered signal can be found by applying the Hilbert transform as a finite impulse response filter (4), followed by processing of the analytic signal (5), as described elsewhere herein. The unrolled phase can then be used for two purposes: First, the times where the phase goes through multiples of $2\pi$ can be used as pitch markers. Further, since the relation between time and unrolled phase is monotonic, it can be inverted: For inversion, the unrolled phase is first replaced by a smoothed version obtained by piecewise Hermite spline functions, leading to representation of time formally as function of phase. Thus, a continuous time function that is associated with or computed from the speech signal, for example F0, energy, MFCCs, log area ratios, and other measureable acoustic wave data can also be represented as a function of phase.

The processing provides, for the duration of a prosodic phonetic unit, a set of polynomial coefficients that describe not only the time values of pitch pulses but also values for other spectral parameters (e.g., LARs) as a function of phase, As is further described herein, the jitter signal, together with the polynomial representation, can provide suitable pitch marker time values.

Over the duration of a prosodic phonetic unit, the number of pitch pulses can usually be determined from the data. Thus, using a normalized phase parameter $\gamma$ in the interval from 0 to 1 as input, the polynomial representing time as function of phase computes the time points of pitch pulses for every increment $1/n$ of $\gamma$, where n is the number of pitch cycles over the entire duration of a prosodic phonetic unit. Furthermore, other sets of polynomial coefficients deliver the spectral coefficients as a function of phase (which implies being a function of time). Modification of the polynomial coefficients can be a starting point to enable simultaneous modification of F0 and duration, as well as other acoustic parameters. Representation by piecewise polynomials is not exact, since the mapping from phase to time is obtained by smoothing. However, the sequence of small time differences between the smoothed pitch pulse sequence and the actually measured sequence can be stored as a jitter signal. For changing fundamental frequency and duration during synthesis the polynomial representation of time as a function of phase can be altered and alternative pitch pulse sequences, associated with the same value of the normalized phase parameter $\gamma$, can be computed.

Figure 15:
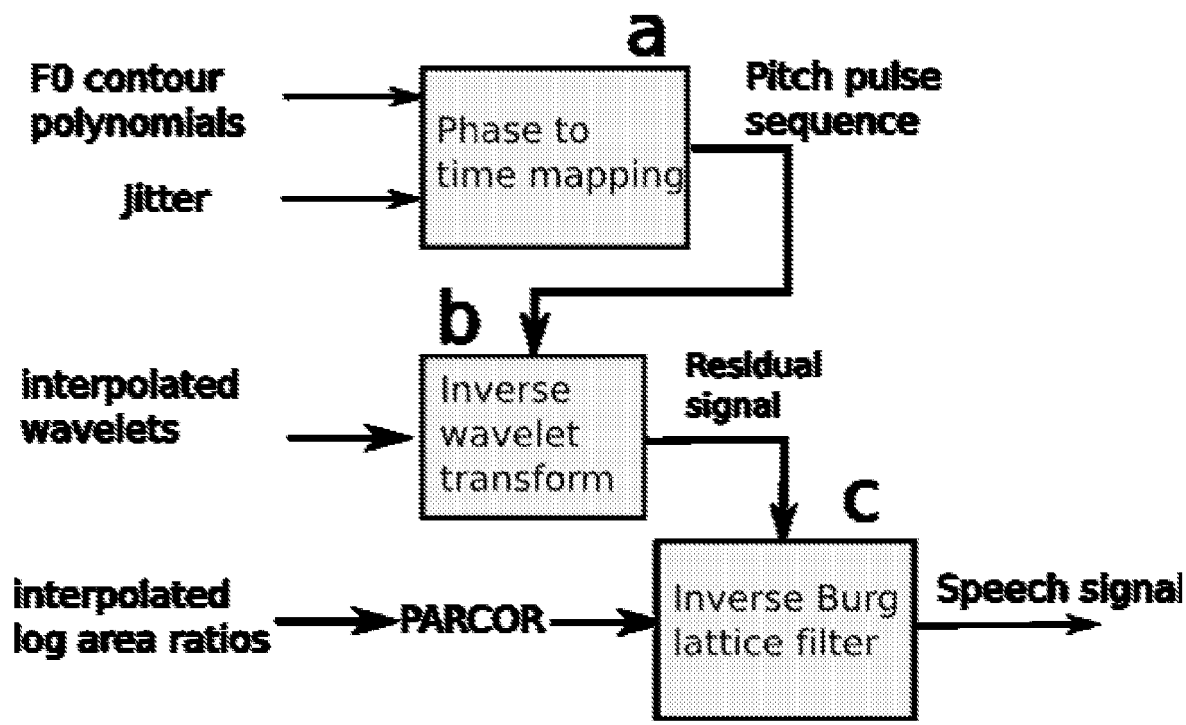
FIG. 15 is a block flow diagram illustrating one embodiment of a method of reassembling a number of speech signal components produced according to method embodiments of the invention, as synthesized speech.

To restore the natural fluctuations of pitch during synthesis, the modified pitch pulse sequence can be altered by adding the jitter, or an interpolated version of the jitter, to the calculated pitch pulse sequence. An example of this method, as shown in FIG. 15 (box a) can be performed with little if any loss of information: In particular, for the case that the pitch pulse sequence is generated from the smoothed phase-to-time polynomial mapping, adding the jitter restores the original pitch pulse sequence.

A pitch synchronous wavelet analysis and re-synthesis (FIG. 15, item b) of the residual signal can be used to facilitate regenerating the residual signal at altered fundamental frequency, using a combination of the inverse wavelet transform with a Laguerre transform, for example as is described and shown in U.S. Patent Application Publication No. 2008/0195391. The Laguerre transform makes it possible to systematically stretch or contract partial signal windows that are centered by a pitch pulse. An implicitly made assumption for the validity of the signal decomposition can be that the residual signal has a flat spectrum and contains little information on the vocal tract resonances, so that a modification of the fundamental frequency does not significantly change the vocal tract resonances. The spectral information about changing vocal tract resonances, which may be mainly associated with articulation, is contained in the log area ratios. Using the original or altered log area ratios, the spectral envelope information can be restored by the inverse lattice filter (see box c in FIG. 15). Alterations and interpolations between different sets of log area ratios also make it possible, within limits, to modify perceived articulation. The resultant output, as shown in FIG. 15, can be a prosodic synthesized speech signal having a human or humanized sound.

The invention includes machines for analysis, modification and/or prediction of acoustic units useful in speech synthesis as well as machines for synthesizing speech from text or other graphic characters, and for recognizing utterances of human speech and rendering the utterances as text or other graphic characters, which machines comprise one or more suitable computerized devices employing or accessing software stored in computer readable media including random access memory, the software being capable of performing or implementing one or more of the methods described herein.

The disclosed invention can be implemented using various general purpose or special purpose computer systems, chips, boards, modules or other suitable systems or devices as are available from many vendors. One exemplary such computer system includes an input device such as a keyboard, mouse or screen for receiving input from a user, a display device such as a screen for displaying information to a user, computer readable storage media, dynamic memory into which program instructions and data may be loaded for processing, and one or more processors for performing suitable data processing operations. The storage media may comprise, for example, one or more drives for a hard disk, a floppy disk, a CD-ROM, a tape or other storage media, or flash or stick PROM or RAM memory or the like, for storing text, data, speech and software or software tools useful for practicing the invention. Alternatively, or in addition, remote storage may be employed for data and/or programs, which may be retrieved as needed, for example across the internet.

The computer system may be a stand-alone personal computer, a workstation, a networked computer or may comprise distributed processing distributed across numerous computing systems, or another suitable arrangement as desired. Files and programs useful in implementing the methods of the invention can be located on the computer system performing the processing or at a remote location.

Software useful for implementing or practicing the invention can be written, created or assembled employing commercially available components, or a suitable programming language, for example Microsoft Corporation's C/C++ or the like. Also by way of example, Carnegie Mellon University's LINK GRAMMAR text parser and the Stanford University Part of Speech Tagger can be employed in text parsing, as can other applications for natural language processing that are known or become known to a person of ordinary skill in the art, for example, dialog systems, automated kiosks, automated directory services, and other tools or applications. Such software, adapted, configured or customized to perform any of the processes of the invention can be implemented on a general purpose computing device or computing machine, or a dedicated or a customized computing device or machine to provide a special purpose speech synthesis or speech recognition device or machine having any one or more of the particular features and elements described herein.

Various embodiments of the invention can be useful for the generation of appealing, humanized machine speech for a wide range of applications, including audio or spoken books, magazines, newspapers, drama and other entertainment, voicemail systems, electronically enabled appliances, automobiles, computers, robotic assistants, games and the like.

Such embodiments of the invention can express messages and other communications in any one or more of a variety of expressive prosody styles including, but are not limited to, reportorial, persuasive, advocacy, human interest, excited, serious, poetic, and others. Other embodiments of the invention can help train speakers to speak with a desired style or can modify the expressiveness of uttered speech, and optionally, transform the speech to have a different prosodic style.

Disclosures Incorporated. The entire disclosure of each and every United States patent and patent application, each foreign and international patent publication, of each other publication and of each unpublished patent application that is specifically referenced in this specification is hereby incorporated by reference herein, in its entirety. Should there appear to be conflict between the meaning of a term employed in the description of the invention in this specification and with the usage in material incorporated by reference from another document, the meaning as used herein is intended to prevail.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. The description of he invention is intended to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that will be or become apparent to a person of ordinary skill in the art as being incompatible with or contrary to the purposes of the invention.

Throughout the description, where methods or processes are described as having, including, or comprising specific process steps, it is contemplated that the processes of the invention can also consist essentially of, or consist of, the recited processing steps. It should be understood that the order of steps or order for performing certain actions is immaterial so long as the invention remains operable. Moreover, two or more steps or actions may be conducted simultaneously.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A computer-implemented method for analyzing, predicting, and/or modifying acoustic units of prosodic human speech utterances for use in speech synthesis or speech recognition, the method comprising:
   (a) initiating analysis of acoustic wave data representing the human speech utterances, via the phase state of the acoustic wave data, the acoustic wave data being in constrained or unconstrained form;
   (b) using one or more phase state defined acoustic wave metrics as common elements for analyzing, and optionally modifying, one or more measurable acoustic parameters selected from the group consisting of pitch, amplitude, duration, and other measurable acoustic parameters of the acoustic wave data, at predetermined time intervals, two or more of the acoustic parameters optionally being analyzed and/or modified simultaneously;
   (c) analyzing acoustic wave data representing a selected one of the acoustic units to determine the phase state of the acoustic unit; and
   (d) analyzing the acoustic wave data representing the selected acoustic unit to determine at least one acoustic parameter of the acoustic unit with reference to the determined phase state of the selected acoustic unit.

2. A method according to claim 1 comprising concatenating the selected acoustic unit with an additional acoustic unit having at least one acoustic parameter compatible with the respective selected acoustic unit parameter as determined in a phase state of the additional acoustic unit similar to, or identical with, the phase state of the selected acoustic unit.

3. A method according to claim 1 comprising concatenating the selected acoustic unit with an additional acoustic unit having a pitch, amplitude and duration compatible with the pitch, amplitude and duration of the selected acoustic unit, as determined in a phase state of the additional acoustic unit similar to, or identical with, the phase state of the selected acoustic unit.

4. A method according to claim 1 comprising matching a sequence of the acoustic units with a sequence of text capable of visually representing the speech utterances.

5. A method according to claim 4 wherein the speech utterances have an identifiable prosody and the method comprises labeling the text with prosodic phonetic units to represent the sequence of text with the prosody identified in the speech signal.

6. A method according to claim 5 comprising tagging each prosodic phonetic unit with a bundle of acoustic feature values to describe the prosodic phonetic unit acoustically.

7. A method according to claim 6 wherein the acoustic feature values comprise values for context-independent prosodic phonetic unit features and, optionally, context-dependent prosodic phonetic unit features determined by applying linguistic rules to the sequence of text.

8. A method according to claim 1 comprising assembling the sequence of acoustic units from available acoustic units in a database of acoustic units, and wherein, optionally, each available acoustic unit in the database comprises a recorded element of speech voiced by a human speaker.

9. A method according to claim 1 comprising determining a desired acoustic unit pathway comprising a sequence of acoustic feature vectors corresponding with a sequence of the acoustic units or with a sequence of text representing the speech utterances.

10. A method according to claim 9 wherein the acoustic feature vectors each comprise a bundle of feature values selected for closeness to a statistical mean of the values of candidate acoustic units to be matched with a prosodic phonetic unit or one of the prosodic phonetic units and, optionally, for acoustic continuity with at least one adjacent acoustic feature vector.

11. A method according to claim 1 comprising modifying a candidate acoustic unit by analyzing the candidate acoustic unit wave data into a vocal tract resonance signal and a residual glottal signal, modifying an acoustic parameter of the glottal signal and recombining the vocal tract resonance signal with the modified glottal signal to provide a modified candidate acoustic unit.

12. A method according to claim 11 comprising analyzing the glottal signal to determine the time-dependent amplitude of the glottal signal with reference to the phase state of the glottal signal, determining the fundamental frequency of the glottal signal in the phase state and modifying the fundamental frequency of the glottal signal in the phase state to have a desired value.

13. A method according to claim 11 wherein the vocal tract resonance signal comprises partial correlation coefficients and the method comprises modifying the vocal tract resonance signal by converting the partial correlation coefficients to log area ratios and altering or interpolating the log area ratios.

14. A method according to claim 1 wherein the acoustic metrics or acoustic parameters comprise one or more metrics or parameters selected from the group consisting of pitch, amplitude, duration, fundamental frequency, formants, mel-frequency cepstral coefficients, energy, and time.

15. A method according to claim 1 wherein the speech signal is a synthesized speech signal comprising a sequence of acoustic units concatenated to audibilize the sequence of text.

16. A method according to claim 1 wherein the acoustic units are derived from prosodic speech recordings generated by human speakers pronouncing text annotated according to specific rules for a defined prosody.

17. A method according to claim 1 wherein the sequence of text is generated to visually represent the speech recognized in the speech signal.

18. A method according to claim 1 wherein the sequence of text is selected from the group consisting of a phrase, a sentence, multiple sentences, a paragraph, multiple paragraphs, a discourse, and a written work.

19. A computerized system comprising software for performing a method according to claim 1, the software being stored in, or resident in, computer readable media.

* * * * *